US011737078B2

(12) United States Patent
Choi et al.

(10) Patent No.: US 11,737,078 B2
(45) Date of Patent: *Aug. 22, 2023

(54) RESOURCE ALLOCATION METHOD, DEVICE AND SYSTEM OF WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,370

(22) Filed: Apr. 17, 2022

(65) Prior Publication Data

US 2022/0287046 A1    Sep. 8, 2022

Related U.S. Application Data

(63) Continuation of application No. 16/960,863, filed as application No. PCT/KR2019/000560 on Jan. 14, 2019, now Pat. No. 11,497,033.

(30) Foreign Application Priority Data

Jan. 13, 2018 (KR) .................. 10-2018-0004732
Feb. 17, 2018 (KR) .................. 10-2018-0018899
(Continued)

(51) Int. Cl.
*H04W 4/00* (2018.01)
*H04W 72/12* (2023.01)
*H04W 72/04* (2023.01)

(52) U.S. Cl.
CPC .......... *H04W 72/12* (2013.01); *H04W 72/04* (2013.01)

(58) Field of Classification Search
CPC . H04W 72/042; H04W 72/044; H04W 72/04; H04L 5/0035; H04J 2203/0067
See application file for complete search history.

(56) References Cited

U.S. PATENT DOCUMENTS 8,667,144 B2    3/2014 Dharmaraju et al.
2011/0201341 A1    8/2011 Choudhury et al.
(Continued)

FOREIGN PATENT DOCUMENTS

KR    10-2017-0113464    10/2017
WO    2014/045608    3/2014
(Continued)

OTHER PUBLICATIONS

Extended European Search Report for European Patent Application No. 22168491.3 dated Jul. 25, 2022.
(Continued)

*Primary Examiner* — Shantell L Heiber
(74) *Attorney, Agent, or Firm* — Ladas & Parry, LLP

(57) ABSTRACT

Disclosed are a UE of a wireless communication system and a wireless communication method using the same. More particularly, the method including receiving scheduling information including resource allocation information, wherein the resource allocation information comprises a RIV determined based on the number of RBs of a first BWP, and transmitting or receiving data on a RB set corresponding to the RIV in a second BWP, wherein the number of RBs of the second BWP is greater than the number of RBs of the first BWP, the starting RB index S and the number of RBs
(Continued)

of the RB set corresponding to the RIV in the second BWP are given in powers of 2 and a device for the same are disclosed.

20 Claims, 18 Drawing Sheets

(30)  Foreign Application Priority Data

Apr. 5, 2018   (KR) ........................ 10-2018-0040028
Apr. 13, 2018  (KR) ........................ 10-2018-0043548

(56)  References Cited

U.S. PATENT DOCUMENTS

| | | | |
|---|---|---|---|
| 2016/0165591 | A1 | 6/2016 | Li et al. |
| 2017/0094548 | A1 | 3/2017 | Choi et al. |
| 2017/0188361 | A1 | 6/2017 | Ko et al. |
| 2017/0201971 | A1* | 7/2017 | Seo ........................ H04W 48/12 |
| 2018/0049203 | A1* | 2/2018 | Xue ........................ H04L 5/0058 |
| 2019/0306861 | A1 | 10/2019 | Li et al. |
| 2019/0320421 | A1 | 10/2019 | Al-Imari et al. |
| 2021/0058940 | A1 | 2/2021 | Choi et al. |

FOREIGN PATENT DOCUMENTS

| | | |
|---|---|---|
| WO | 2019/191901 | 10/2019 |
| WO | 2019/221527 | 11/2019 |

OTHER PUBLICATIONS

Extended European Search Report for European Patent Application No. 22168505.0 dated Jul. 25, 2022.
Notice of Allowance for U.S. Appl. No. 16/960,863 dated Sep. 8, 2022.
Office Action for Japanese Patent Application No. 2020-538605 dated Aug. 29, 2022 and its English translation provided by the Applicant's foreign counsel.
Notice of Allowance dated May 30, 2022 for Korean Patent Application No. 10-2020-7021100 and its English translation provided by the Applicant's foreign counsel.
Fujitsu, "Discussion on frequency domain resource allocation." R1-1715487, 3GPP TSG RAN WG1 Meeting NR#3. Nagoya, Japan. Sep. 11, 2017. See pp. 2-4; and table 1.
Interdigital, Inc. "On data resource allocation for NR." R1-1716482, 3GPP TSG RAN WG1 Meeting #90. Nagoya, Japan, Sep. 12, 2017, See pp. 2-4; and figure 1.
CATT. "Remaining aspects of BWP operation." R1-1717839. 3GPP TSG RAN WG1 Meeting #90bis. Prague, Czechia. Oct. 3, 2017. See pp. 2-3; and table 1.
ZTE et al. "Considerations on resource allocation issues." R1-1715558. 3GPP TSG RAN-NR#3. Nagoya, Japan. Sep. 12, 2017, See pp. 1-5; and table 1.
International Search Report for PCT/KR2019/000560 dated May 3, 2019 and its English translation from WIPO (now published as WO 2019/139444).
Written Opinion of the International Searching Authority for PCT/KR2019/000560 dated May 3, 2019 and its English translation by Google Translate (now published as WO 2019/139444).
Extended European Search Report for European Patent Application No. 19738070.2 dated Oct. 11, 2021.
International Preliminary Report on Patentability (Chapter I) for PCT/KR2019/000560 dated Jul. 14, 2020 and its English translation from WIPO (published as WO 2019/139444).
Office Action for Indian Patent Application No. 202027027829 dated Nov. 10, 2021.
Wilus Inc.: "Discussion on DCI contents and formats", 3GPP TSG RAN WG1 Meeting #92bis, R1-1805241, Sanya, China, Apr. 7, 2018, pp. 1-9.
Wilus Inc.: "Remaining Issues on DCI contents and formats", 3GPP TSG RAN WG1 Meeting #93, R1-1807233, Busan, Korea, May 12, 2018, pp. 1-9.
Office Action dated Mar. 11, 2022 for U.S. Appl. No. 16/960,863 (now published as US 2021/0058940).
Notice of Allowance dated Jan. 20, 2023 for U.S. Appl. No. 17/722,374.
Notice of Allowance dated Jan. 23, 2023 for Japanese Patent Application No. 2020-538605 and its English translation provided by Applicant's foreign counsel.

\* cited by examiner

RA = [1 0 0 1 1]
BWP#1 | RBG#1 | RBG#2 | RBG#3 | RBG#4 | RBG#5 |

(a)

RA = [1 0 0 1 1] offset = 0
BWP#2 | RBG#1 | RBG#2 | RBG#3 | RBG#4 | RBG#5 | RBG#6 | RBG#7 | RBG#8 |

(b)

RA = [1 0 0 1 1] offset = 2
BWP#2 | RBG#1 | RBG#2 | RBG#3 | RBG#4 | RBG#5 | RBG#6 | RBG#7 | RBG#8 |

(a) UPLINK DATA TRANSMISSION (a) DOWNLINK DATA TRANSMISSION

| CHECK RB SET CORRESPONDING TO RESOURCE ALLOCATION INFORMATION IN FREQUENCY RESOURCE ALLOCATION AREA OF ACTIVE BWP<br><br>\* WHEN SATISFYING CONDITION, FREQUENCY RESOURCE ALLOCATION AREA FOLLOWS INITIAL BWP | S2002 |
|---|---|
| TRANSMIT RADIO SIGNAL IN RB SET | S2004 |

RESOURCE ALLOCATION METHOD, DEVICE AND SYSTEM OF WIRELESS COMMUNICATION SYSTEM

CROSS-REFERENCE TO RELATED APPLICATIONS

This application is a continuation of U.S. patent application Ser. No. 16/960,863 filed on Jul. 8, 2020, which is the U.S. National Stage of International Patent Application No. PCT/KR2019/000560 filed on Jan. 14, 2019, which claims the priority to Korean Patent Application No. 10-2018-0004732 filed on Jan. 13, 2018, Korean Patent Application No. 10-2018-0018899 filed on Feb. 17, 2018, Korean Patent Application No. 10-2018-0040028 filed on Apr. 5, 2018 and Korean Patent Application No. 10-2018-0043548 filed on Apr. 13, 2018, the entire contents of which are incorporated herein by reference.

TECHNICAL FIELD

The present invention relates to a wireless communication system. More specifically, the present invention relates to a wireless communication method, apparatus, and system for transmitting and receiving data channels and control channels.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF THE INVENTION

Technical Problem

An object of the present invention is to provide a method for efficiently transmitting and receiving signals in a wireless communication system, particularly a cellular wireless communication system and a device therefor.

Technical Solution

In order to solve the above problems, an apparatus and a wireless communication method of the following wireless communication system are provided.

In the first aspect of the present invention, a method performed by a UE in a wireless communication system includes: receiving scheduling information including resource allocation information, wherein the resource allocation information includes a Resource Indication Value (RIV) determined based on the number of Resource Blocks (RBs) of a first bandwidth part (BWP); and transmitting or receiving data on a RB set corresponding to the RIV in a second BWP, wherein if the number of RBs of the second BWP is greater than the number of RBs of the first BWP, a starting RB index S and the number of RBs L of the RB set corresponding to the RIV in the second BWP respectively have one of the following values:

Starting RB index S: $\{0, K, 2^*K, \ldots, (N_{BWP1}-1)^*K\}$, and
Number of RBs L: $\{K, 2^*K, 3^*K, \ldots, N_{BWP1}{}^*K\}$
where $N_{BWP1}$ is the number of RBs of the first BWP, and K is a power value of 2 and is determined based on (the number of RBs of the second BWP/the number of RBs of the first BWP).

In the second aspect of the present invention, a method performed by a base station in a wireless communication system includes: receiving scheduling information including resource allocation information, wherein the resource allocation information includes a Resource Indication Value (RIV) determined based on the number of Resource Blocks (RBs) of a first bandwidth part (BWP); and transmitting or receiving data on a RB set corresponding to the RIV in a second BWP, wherein if the number of RBs of the second BWP is greater than the number of RBs of the first BWP, a starting RB index S and the number of RBs L of the RB set corresponding to the RIV in the second BWP respectively have one of the following values:

Starting RB index S: $\{0, K, 2^*K, \ldots, (N_{BWP1}-1)^*K\}$, and
Number of RBs L: $\{K, 2^*K, 3^*K, \ldots, N_{BWP1}{}^*K\}$
where $N_{BWP1}$ is the number of RBs of the first BWP, and K is a power value of 2 and is determined based on (the number of RBs of the second BWP/the number of RBs of the first BWP).

In the first and second aspects, the first BWP and the second BWP include one of the following:
(first BWP, second BWP)=(initial BWP, active BWP), and
(first BWP, second BWP)=(currently activated BWP, newly activated BWP),
wherein the currently activated BWP is an active BWP of a time point at which the scheduling information is received, and the newly activated BWP is a BWP indicated by a bandwidth part indicator (BPI) in the scheduling information.

In the first and second aspects, K has the following values according to (the number of RBs of second BWP/the number of RBs of first BWP):

| | $1 < X < 2$ | $2 \leq X < 4$ | $4 \leq X < 8$ | $8 \leq X < 16$ | ... | $2^n \leq X < 2^{n+1}$ |
|---|---|---|---|---|---|---|
| K | 1 | 2 | 4 | 8 | ... | $2^n$ | where X is (the number of RBs of second BWP/the number of RBs of first BWP), and n is an integer of 0 or more. In the first and second aspects, the RIV has a value satisfying the following Equation:

$$RIV = N_{BWP1}{}^*(L'-1)+S', \text{ if } (L'-1) \leq \text{floor}(N_{BWP1}/2), 또는$$

$$RIV = N_{BWP1}{}^*(N_{BWP1}-L'+1)+(N_{BWP1}-1-S'),$$
$$\text{if } (L'-1) > \text{floor}(N_{BWP1}/2),$$

where L' is a value of $1 \leq L' \leq N_{BWP1}-S'$ as L/K, and S' is S/K.

In the first and second aspects, when the number of RBs of the second BWP is equal to or less than the number of RBs of the first BWP, the starting RB index S and the number of RBs of the RB set corresponding to the RIV in the second BWP are given by one of the following values:

Starting RB index S: $\{0, 1, 2, \ldots, N_{BWP2}-1\}$, and
The number of RBs L: $\{1, 2, 3, \ldots, N_{BWP2}\}$,
where $N_{BWP2}$ is the number of RBs of the second BWP.

In the third aspect of the present invention, a device used in a wireless communication system includes: a memory; and a processor, wherein the processor receives scheduling information including resource allocation information, wherein the resource allocation information includes a Resource Indication Value (RIV) determined based on the number of Resource Blocks (RBs) of a first bandwidth part (BWP); and transmits or receives data on a RB set corresponding to the RIV in a second BWP, wherein if the number of RBs of the second BWP is greater than the number of RBs of the first BWP, a starting RB index S and the number of RBs L of the RB set corresponding to the RIV in the second BWP respectively have one of the following values:

Starting RB index S: $\{0, K, 2^*K, \ldots, (N_{BWP1}-1)^*K\}$, and
Number of RBs L: $\{K, 2^*K, 3^*K, \ldots, N_{BWP1}{}^*K\}$
where $N_{BWP1}$ is the number of RBs of the first BWP, and K is a power value of 2 and is determined based on (the number of RBs of the second BWP/the number of RBs of the first BWP).

In the fourth aspect of the present invention, a device used in a wireless communication system includes: a memory; and a processor, wherein the processor transmits scheduling information including resource allocation information, wherein the resource allocation information includes a Resource Indication Value (RIV) determined based on the number of Resource Blocks (RBs) of a first bandwidth part (BWP); and transmits or receives data on a RB set corresponding to the RIV in a second BWP, wherein if the number of RBs of the second BWP is greater than the number of RBs of the first BWP, a starting RB index S and the number of RBs L of the RB set corresponding to the RIV in the second BWP respectively have one of the following values:

Starting RB index S: $\{0, K, 2^*K, \ldots, (N_{BWP1}-1)^*K\}$, and
Number of RBs L: $\{K, 2^*K, 3^*K, \ldots, N_{BWP1}{}^*K\}$
where $N_{BWP1}$ is the number of RBs of the first BWP, and K is a power value of 2 and is determined based on (the number of RBs of the second BWP/the number of RBs of the first BWP).

In the third and fourth aspects, the first BWP and the second BWP include one of the following:
(first BWP, second BWP)=(initial BWP, active BWP), and
(first BWP, second BWP)=(currently activated BWP, newly activated BWP),
wherein the currently activated BWP is an active BWP of a time point at which the scheduling information is received, and the newly activated BWP is a BWP indicated by a bandwidth part indicator (BPI) in the scheduling information.

In the third and fourth aspects, K has the following values according to (the number of RBs of second BWP/the number of RBs of first BWP):

| | $1 < X < 2$ | $2 \leq X < 4$ | $4 \leq X < 8$ | $8 \leq X < 16$ | ... | $2^n \leq X < 2^{n+1}$ |
|---|---|---|---|---|---|---|
| K | 1 | 2 | 4 | 8 | ... | $2^n$ | where X is (the number of RBs of second BWP/the number of RBs of first BWP), and n is an integer of 0 or more. In the third and fourth aspects, the RIV has a value satisfying the following Equation:

$$RIV = N_{BWP1} * (L'-1) + S', \text{ if } (L'-1) \leq \text{floor}(N_{BWP1}/2), \text{ and}$$

$$RIV = N_{BWP1} * (N_{BWP1} - L' + 1) + (N_{BWP1} - 1 - S'),$$
$$\text{if } (L'-1) > \text{floor}(N_{BWP1}/2),$$

where L' is a value of $1 \leq L' \leq N_{BWP1} - S'$ as L/K, and S' is S/K.

In the third and fourth aspects, when the number of RBs of the second BWP is equal to or less than the number of RBs of the first BWP, the starting RB index S and the number of RBs of the RB set corresponding to the RIV in the second BWP are given by one of the following values:

Starting RB index S: $\{0, 1, 2, \ldots, N_{BWP2}-1\}$, and
The number of RBs L: $\{1, 2, 3, \ldots, N_{BWP2}\}$,
where $N_{BWP2}$ is the number of RBs of the second BWP.

Advantageous Effects

According to an embodiment of the present invention, it is possible to efficiently transmit and receive signals in a wireless communication system, particularly, a cellular wireless communication system.

Effects obtainable from various embodiments of the present disclosure are not limited to the above-mentioned effects, and other effects not mentioned above may be clearly derived and understood to those skilled in the art from the following description.

BRIEF DESCRIPTION OF THE DRAWINGS

FIG. 13 illustrates another resource allocation in an embodiment of the present invention.

MODE FOR CARRYING OUT THE INVENTION

Figure 1:
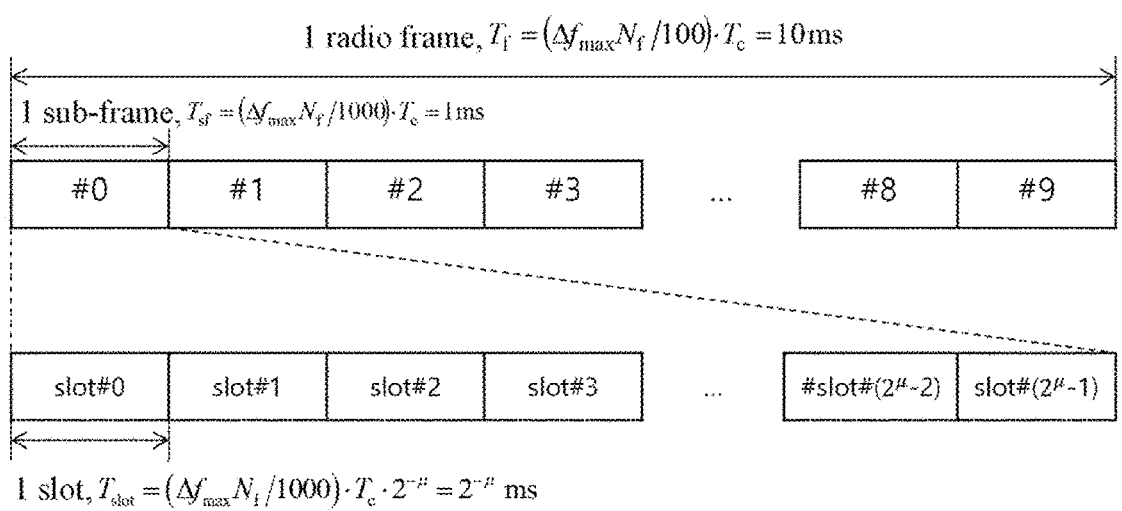
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

In this specification, ceil A denotes a rising function, floor A denotes a falling function, and A mod B denotes the remainder of A divided by B.

FIG. 1 illustrates an example of a wireless frame structure used in a wireless communication system. Referring to FIG. 1, the wireless frame (or radio frame) used in the 3GPP NR system may have a length of 10 ms ($\Delta f_{max}N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 2 slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
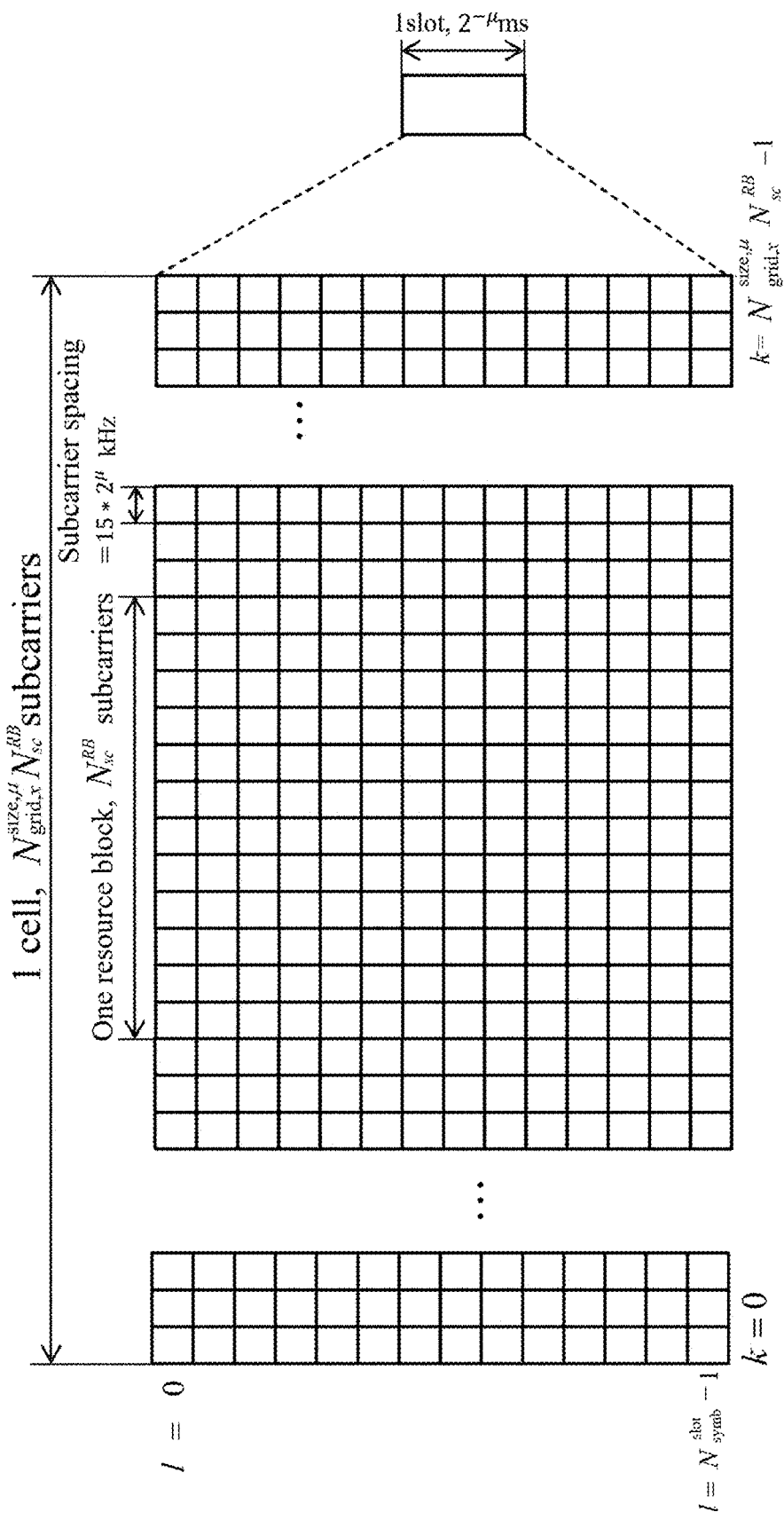
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system. There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to as simply as symbols. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated by a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

mation in the PDCCH, so that the UE can obtain more specific system information than the system information obtained through the initial cell search (S102).

When the UE initially accesses the base station or does not have radio resources for signal transmission, the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for

TABLE 1

| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|---|---|---|---|---|---|---|---|---|
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | D | X | X | X | X | U |
| 16 | D | X | X | X | X | X | X | X | X | X | X | X | X | X | 44 | D | D | D | D | D | D | X | X | X | X | X | X | U | U |
| 17 | D | D | X | X | X | X | X | X | X | X | X | X | X | X | 45 | D | D | D | D | D | D | X | X | U | U | U | U | U | U |
| 18 | D | D | D | X | X | X | X | X | X | X | X | X | X | X | 46 | D | D | D | D | D | X | U | D | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | D | X | X | U | D | D | D | D | X | X | U |
| 22 | D | X | X | X | X | X | X | X | X | X | X | X | U | U | 50 | D | D | X | X | U | U | U | D | D | X | X | U | U | U |
| 23 | D | D | X | X | X | X | X | X | X | X | X | X | U | U | 51 | D | X | X | U | U | U | U | D | X | X | U | U | U | U |
| 24 | D | D | D | X | X | X | X | X | X | X | X | X | U | U | 52 | D | X | X | X | X | X | U | D | X | X | X | X | X | U |
| 25 | D | X | X | X | X | X | X | X | X | X | X | U | U | U | 53 | D | D | X | X | X | X | U | D | D | X | X | X | X | U |
| 26 | D | D | X | X | X | X | X | X | X | X | X | U | U | U | 54 | X | X | X | X | X | X | D | D | D | D | D | D | D | D |
| 27 | D | D | D | X | X | X | X | X | X | X | X | U | U | U | 55 | D | D | X | X | X | U | U | U | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
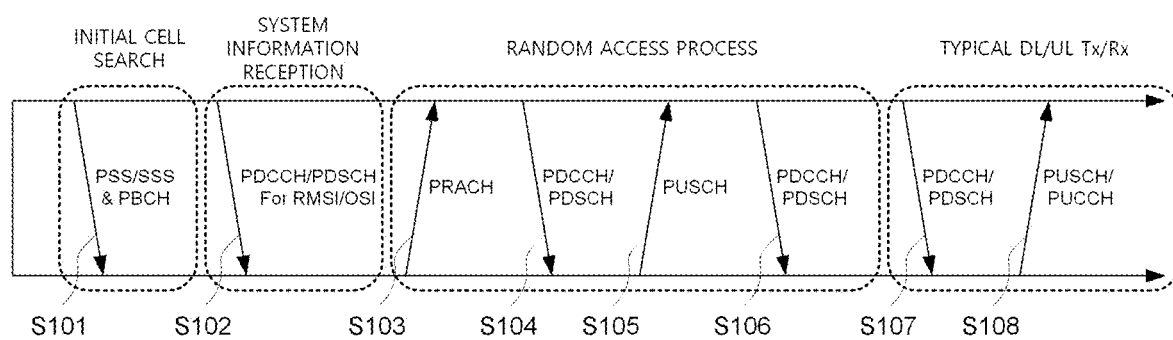
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel. If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and inforcollision resolution. If the UE successfully receives the PDCCH through the identifier of the UE (S106), the random access process is terminated.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
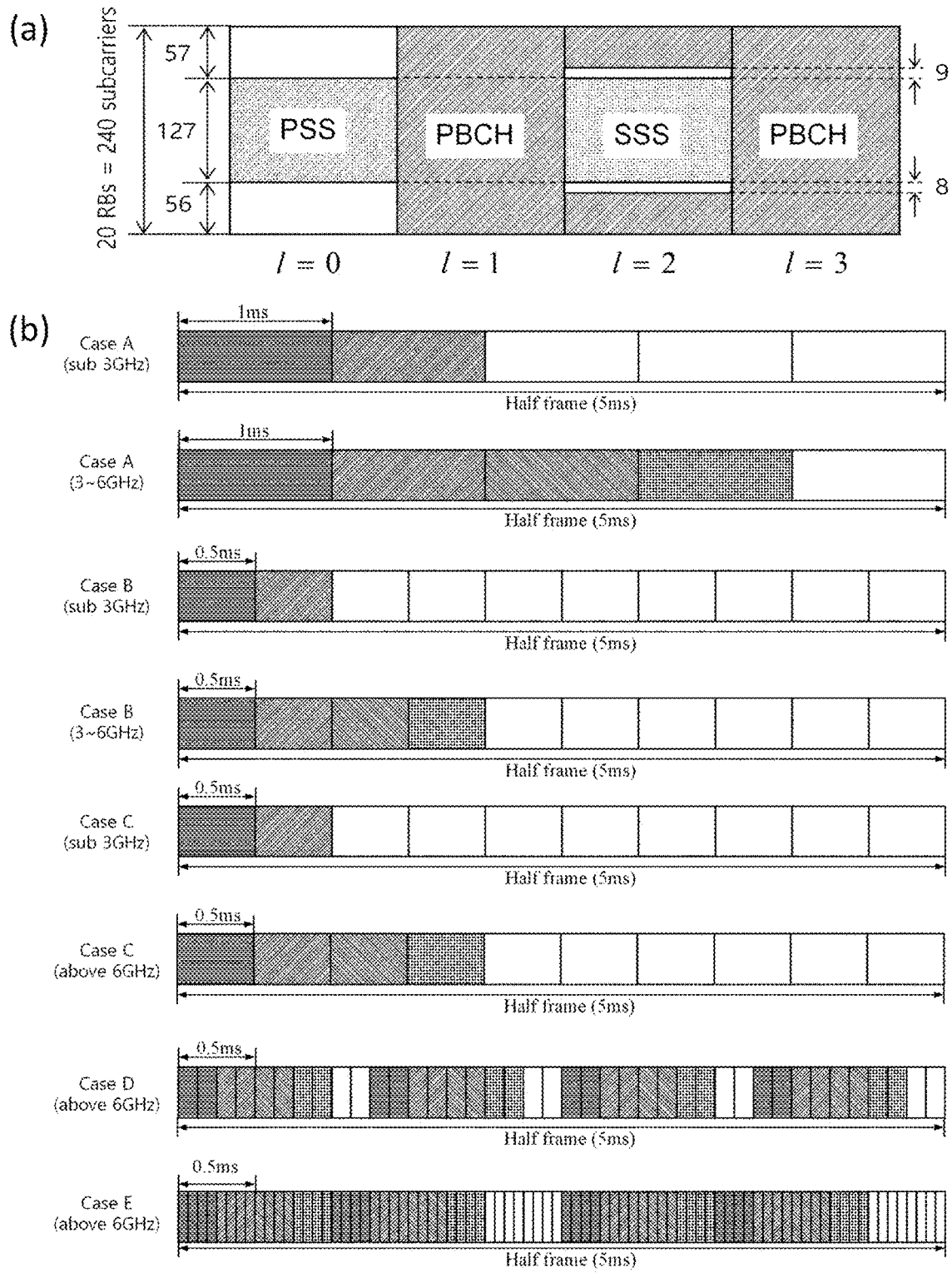
FIG. 4 illustrates an SS/PBCH block for initial cell access in a 3GPP NR system.

FIG. 4 illustrates an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N_{ID}^{(2)})\bmod 127$$

$$0 \leq n < 127$$

Here, x(i+7)=(x(i+4)+x(i))mod 2 and is given as [x(6) x(5) x(4) x(3) x(2) x(1) x(0)]=[1 1 1 0 1 1 0].

Further, the sequence $d_{SSS}(n)$ of the SSS is as follows.

$$d_{SSS}(n) = [1 - 2x_0((n + m_0) \bmod 127)][1 - 2x_1((n + m_1)\bmod127)]$$

$$m_0 = 15 \left\lfloor \frac{N^{(1)}_{ID}}{112} \right\rfloor + 5N^{(2)}_{ID}$$

$$m_1 = N^{(1)}_{ID} \bmod 112$$

$$0 \leq n < 127$$

$$x_0(i+7) = (x_0(i+4) + x_0(i))\bmod 2$$

$$x_1(i+7) = (x_1(i+1) + x_1(i))\bmod 2 \text{ and is given as}$$

Here, $$[x_0(6) \ x_0(5) \ x_0(4) \ x_0(3) \ x_0(2) \ x_0(1) \ x_0(0)] = [0 \ 0 \ 0 \ 0 \ 0 \ 0 \ 1]$$

$$[x_1(6) \ x_1(5) \ x_1(4) \ x_1(3) \ x_1(2) \ x_1(1) \ x_1(0)] = [0 \ 0 \ 0 \ 0 \ 0 \ 0 \ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more,n=0, 1, 2, 3, 5, 6, 7, 8.

Figure 5:
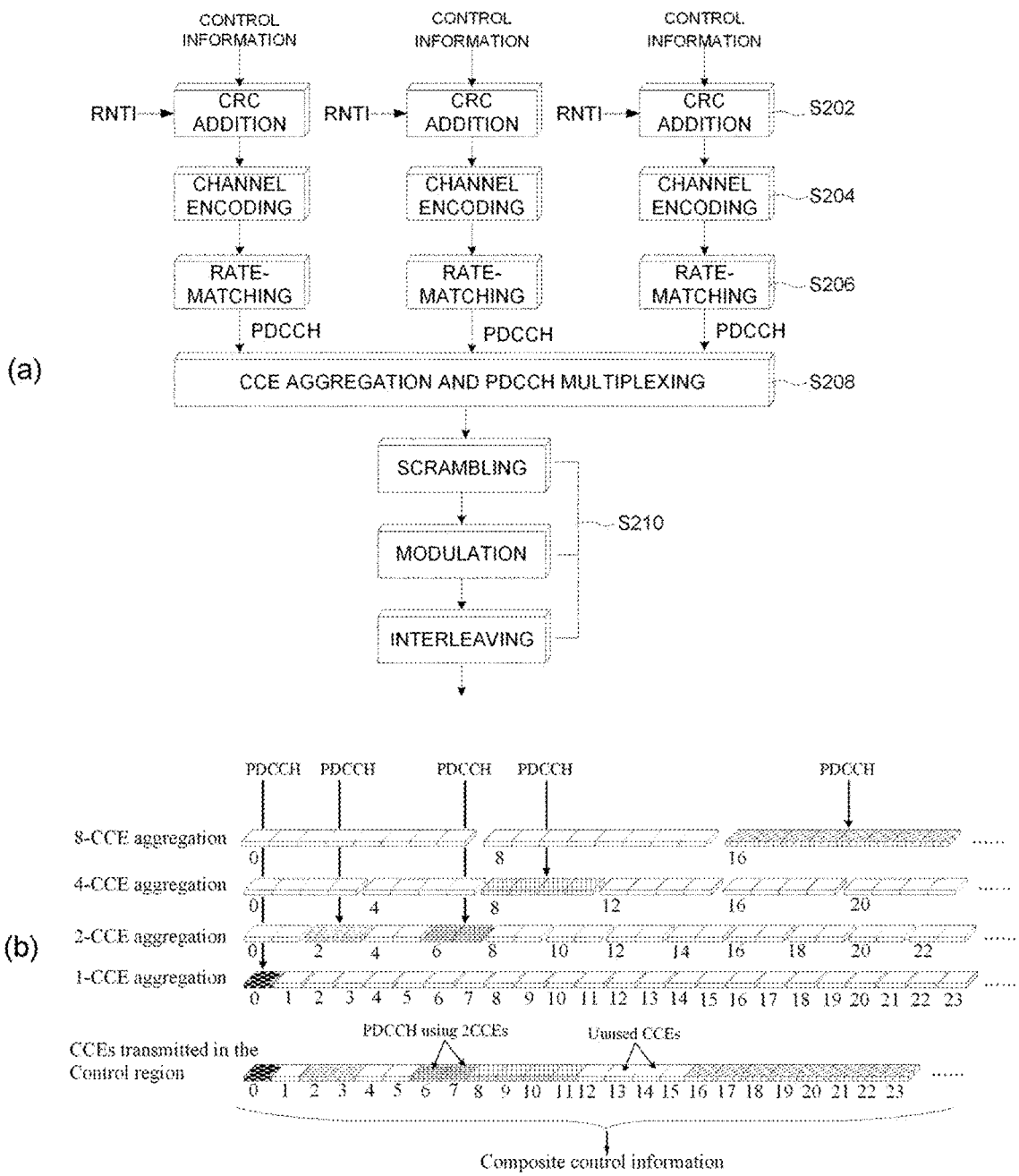
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
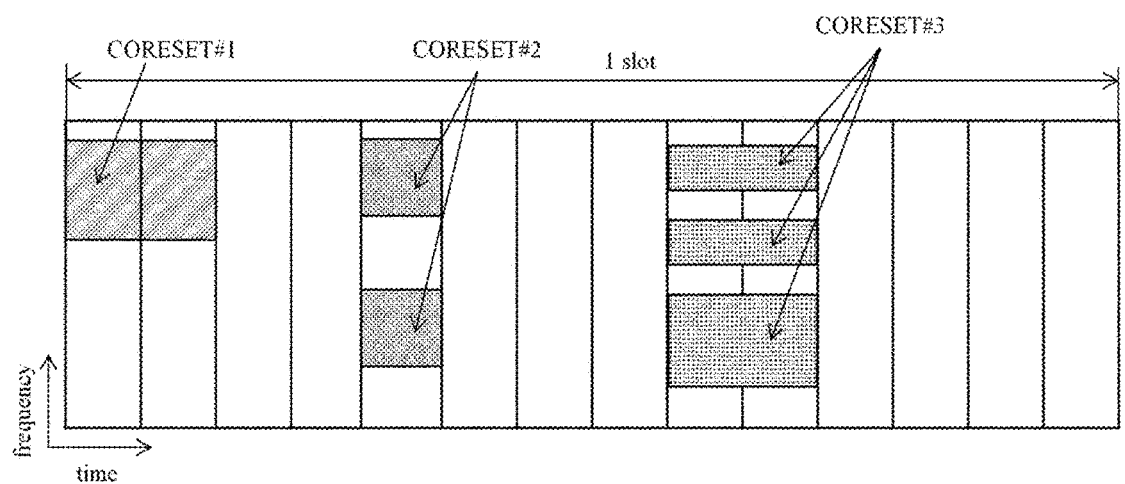
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system. The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
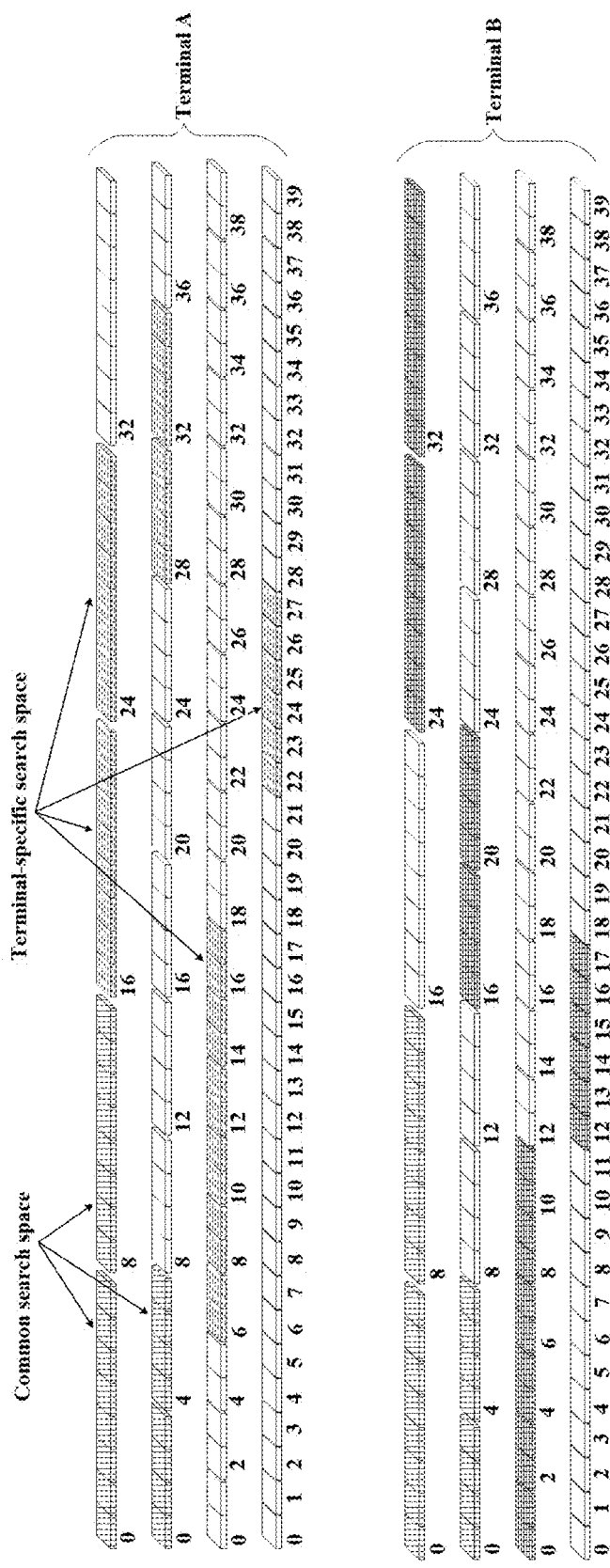
FIG. 7 illustrates a method for configuring a PDCCH search space in a 3GPP NR system.

FIG. 7 illustrates a method for setting a PUCCH search space in a 3GPP NR system. In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).
  Scheduling Request (SR): Information used for requesting a UL UL-SCH resource.
  HARQ-ACK: A Response to PDCCH (indicating DL SPS release) and/or a response to DL transport block (TB)

on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one RB on the frequency axis. When PUCCH format 0 is transmitted in two OFDM symbols, the same sequence to the two symbols may be transmitted through different RBs. Through this, the UE can obtain a frequency diversity gain. More specifically, the UE may determine a value $m_{cs}$ of a cyclic shift according to $M_{bit}$ bit UCI ($M_{bit}$=1 or 2), and map a sequence obtained by cyclic-shifting a base sequence having a length of 12 to a predetermined value $m_{cs}$ to 12 REs of one PRB of one OFDM symbol and transmit it. If the number of cyclic shifts available to the UE is 12 and $M_{bit}$=1, 1 bit UCI 0 and 1 can be represented by a sequence corresponding to two cyclic shifts in which the difference in cyclic shift values is 6. In addition, when $M_{bit}$=2, 2 bit UCI 00, 01, 11, and 10 may be represented by a sequence corresponding to four cyclic shifts in which the difference in cyclic shift values is 3.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Figure 8:
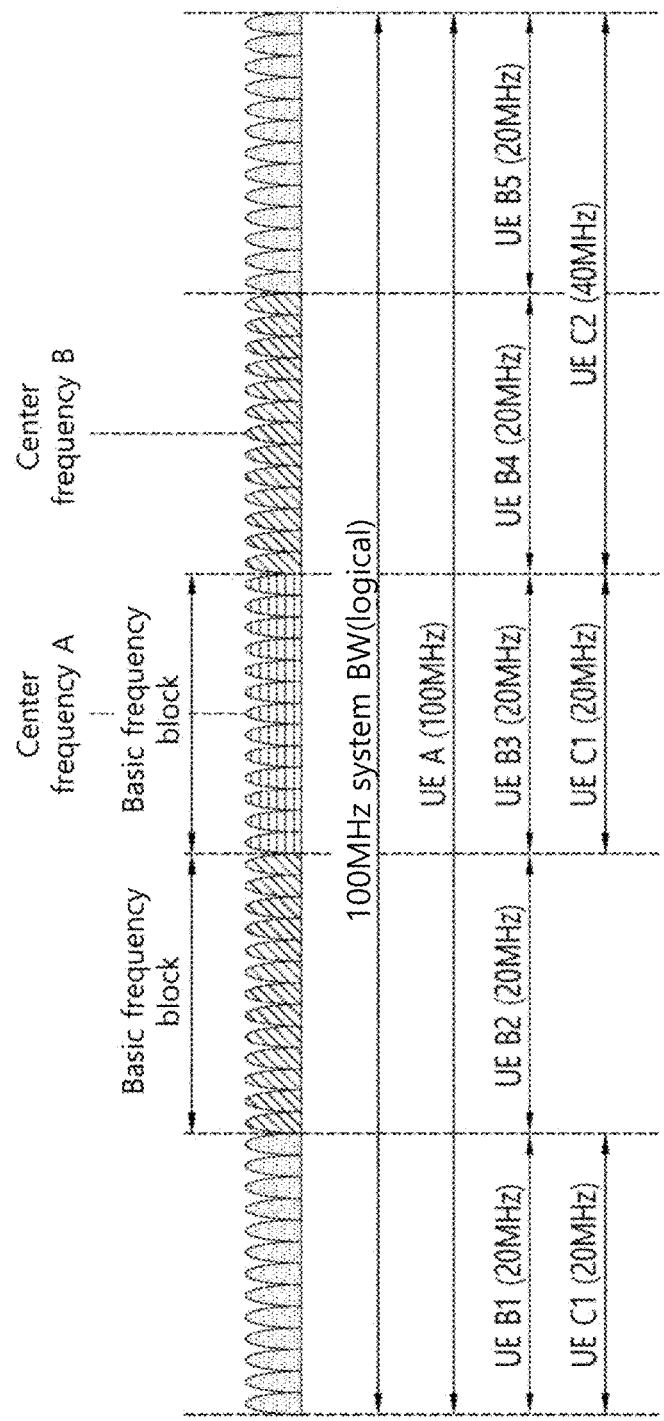
FIG. 8 is a conceptual diagram illustrating carrier aggregation.

FIG. 8 is a conceptual diagram illustrating carrier aggregation. The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
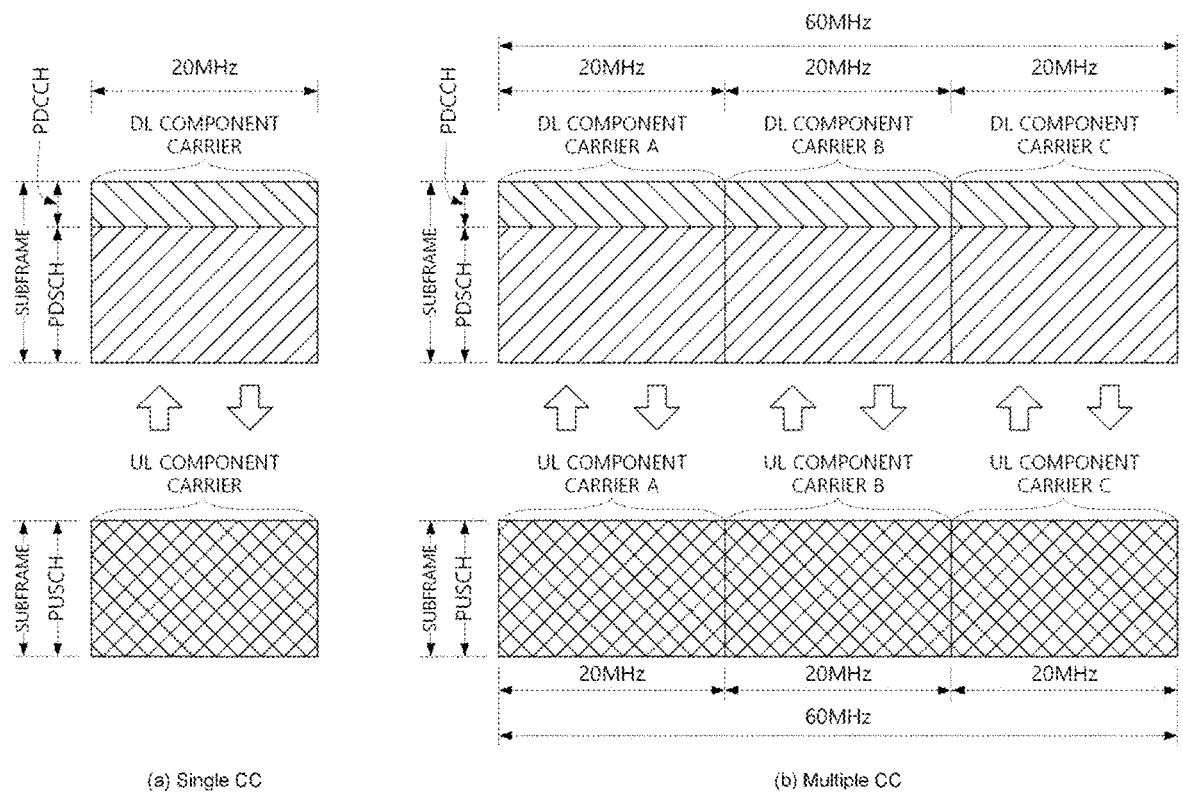
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
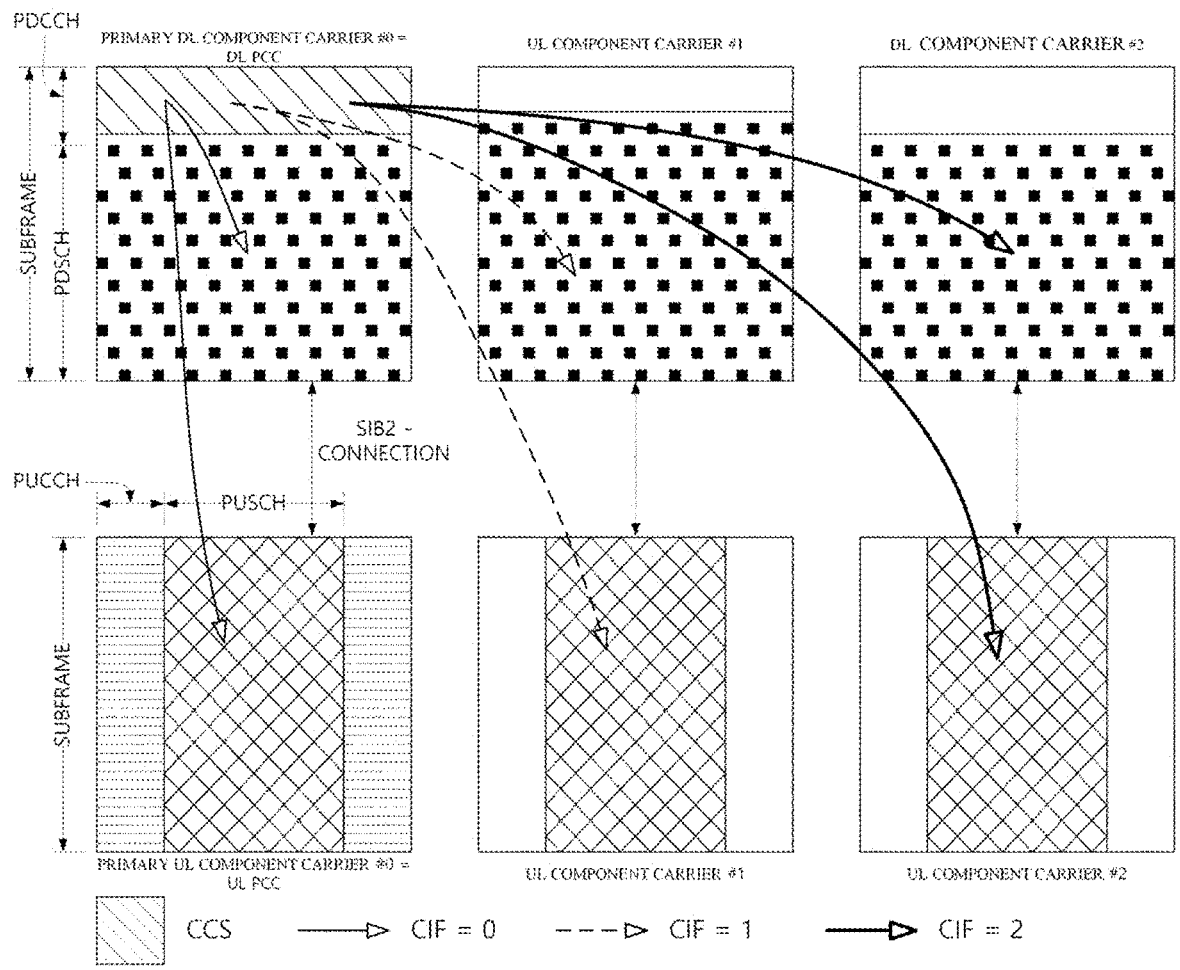
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
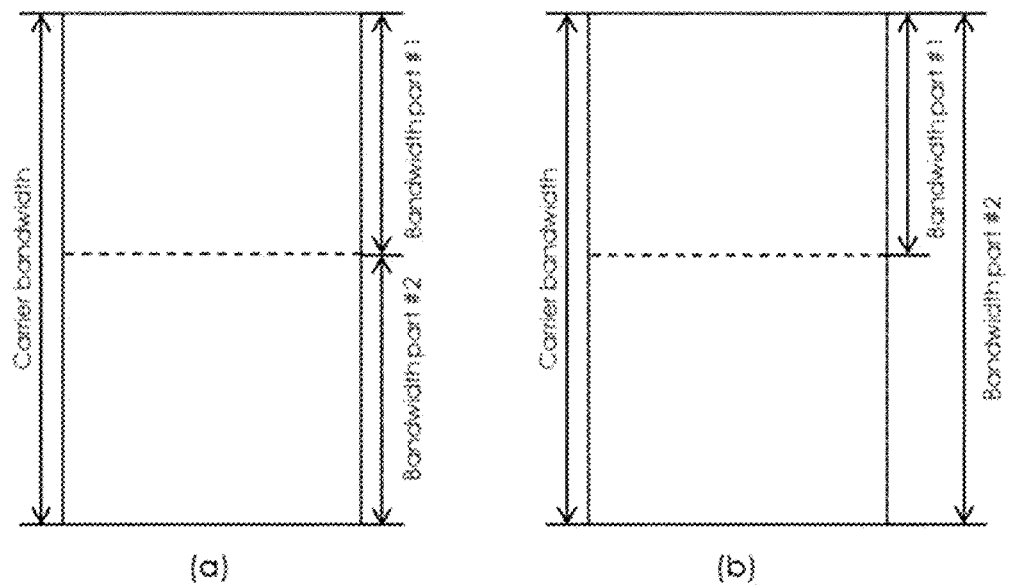
FIGS. 11 to 12 are diagrams illustrating a bandwidth part (BWP) configuration.

Referring to FIG. 11, in a 3GPP NR system, UEs can perform transmission/reception using a bandwidth equal to or less than that of a carrier (or cell). To this end, the UE may be configured with one or more Bandwidth part (BWP) from the base station. The BWP consists of consecutive PRBs. Referring to FIG. 11(a), BWPs may be configured to not overlap within a bandwidth of a carrier (or cell). Referring to FIG. 11(b), BWPs in a carrier (or cell) may be configured to overlap. In addition, one BWP may be configured to be included in another BWP. One or more BWPs among the BWPs configured in the carrier (or cell) may be allocated and configured for each UE. In the carrier (or cell), only one BWP is active (active BWP), and the UE does not expect to receive or transmit any signal in the PRB other than the active BWP in the carrier (or cell). The UEs may transmit and receive with the base station using one active BWP of the allocated and configured BWP(s).

In the TDD cell, up to 4 DL BWP and up to 4 UL BWP per cell may be configured. In the FDD cell, up to four DL/UL BWP pairs per cell may be configured. The UE may activate one DL BWP and one UL BWP for each carrier (or cell). The UE moving from one BWP to another BWP, that is, deactivating the current BWP and activating a new BWP (hereinafter, BWP switching) may be indicated using DCI. Specifically, in order to change the DL BWP of the UE, a Bandwidth part indicator (BPI) indicating a newly activated BWP may be included in DCI scheduling the PDSCH. That is, when DCI scheduling the PDSCH is received, the UE can know through which BWP the PDSCH is transmitted through the BPI, and know from which PRBs in the BWP indicated by the BPI the PDSCH is transmitted through DCI's Resource Allocation (RA) information. Similarly, in order to change the UL BWP of the UE, a BPI indicating a newly activated BWP may be included in DCI scheduling PUSCH. That is, when DCI scheduling PUSCH is received, the UE can know through which BWP the PUSCH should be transmitted through the BPI, and know which PRBs in the BWP indicated by the BPI should transmit PUSCH through RA information of the DCI. In the case of TDD cells, BPI indicates DL BWP or UL BWP, and in the case of FDD cells, BPI indicates DL BWP/UL BWP pair.

Figure 12:
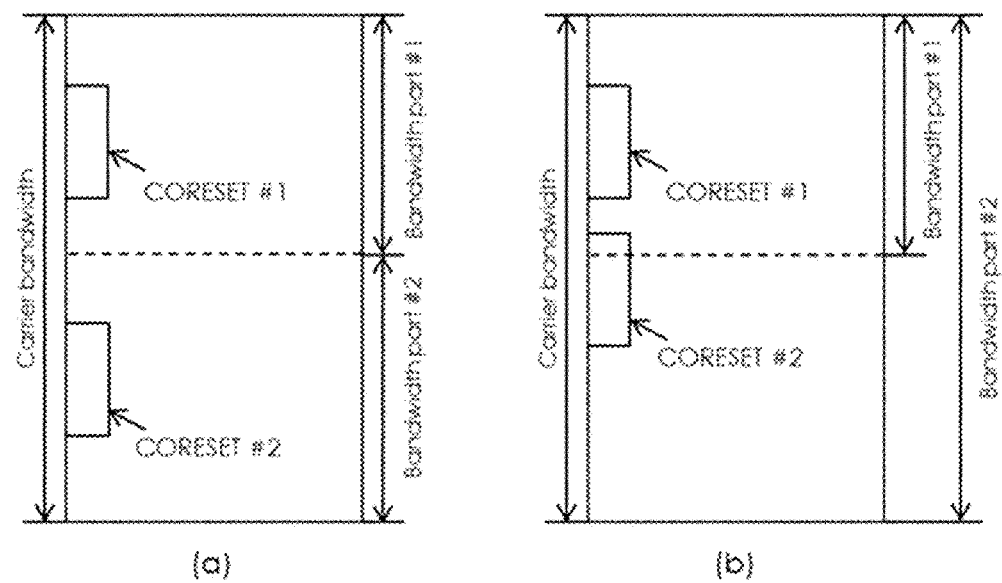

Referring to FIG. 12, when a plurality of BWPs are configured in the UE, at least one CORESET may be configured/allocated to the UE in each BWP. Referring to FIGS. 12(a) and (b), a CORESET for each BWP may be located in a time/frequency resource domain occupied by each BWP. In other words, CORESET #1 for BWP #1 exists in PRBs in the time/frequency resource domain occupied by BWP #1, and CORESET #2 for BWP #2 may exist in PRBs in the time/frequency resource domain occupied by BWP #2. Referring to FIG. 12(b), when the BWP is configured to overlap each other, PRBs occupied by CORESET are within their own BWP time/frequency resource domain, but can be located in other BWPs. In other words, CORESET #2 for BWP #2 may overlap PRB(s) of the time/frequency resource domain occupied by BWP #1.

As described above, a plurality of BWPs may be configured in a carrier (or cell), and each BWP may be composed of a plurality of consecutive PRBs. On the other hand, only one BWP is activated in the carrier (or cell) (active BWP), and the UE does not expect to receive or transmit any signal in the PRB other than the active BWP in the carrier (or cell). The active BWP can be changed using BPI in DCI (BWP switching or change). The BWP indicated through the BPI is newly activated, and other configured BWP(s) are deactivated. The BPI may be included in DCI scheduling PDSCH or PUSCH.

When a plurality of BWPs are configured in a carrier (or cell), the band/size (e.g., number of PRBs) of each BWP may be independently configured. Accordingly, the number of PRBs may be different for each BWP. Meanwhile, the size of the DCI transmitted from the activated BWP may be determined based on the size of the BWP. Specifically, the RA field size of the DCI transmitted from the activated BWP may be determined based on the size of the active BWP or the initial BWP. Therefore, when DCI schedules a BWP having a different size from the BWP used for DCI size determination, the problem that the length/size (e.g., number of bits) of the RA field is different should be solved.

Hereinafter, a method for allocating resources when BWP(s) are configured in a carrier (or cell) and a method for transmitting and receiving data accordingly are described.

For convenience of explanation, the terms are first defined as follows.

Active BWP: Indicates activated BWP. One BWP can be activated per cell. It indicates the BWP through which signals are transmitted and received. For example, the DL active BWP represents a BWP on which PDCCH/PDSCH reception is performed. UL active BWP represents a BWP on which PUCCH/PUSCH transmission is performed. Depending on the duplex method, DL active BWP and UL active BWP may be the same or different.

Inactive BWP: Indicates inactivated BWP. It represents the remaining BWP except one active BWP in one cell, and is a BWP in which signal transmission and reception is not performed.

BWP switching: BWP switching is a process of changing an active BWP from a currently activated BWP to a newly activated BWP. For example, when (i) the active BWP of the time point at which the PDCCH (or DCI) is received and (ii) the BWP indicated by the BPI of the PDCCH (or DCI) are different, the UE may change the active BWP from the currently active BWP to the BWP indicated by the BPI. That is, after switching the BWP, the active BWP becomes the BWP indicated by the BPI of the PDCCH (or DCI).

Current (active) BWP: It is the active BWP at the current time point at which the PDCCH (or DCI) including the scheduling information is received. The currently activated BWP may have a different UL BWP and DL BWP. When BWP switching is performed, it may be referred to as a previous (active) BWP compared to a new (active) BWP to be newly activated.

New (active) BWP: At a current time point of receiving a PDCCH (or DCI) including scheduling information, it is an inactive BWP, but indicates a BWP to be activated by BWP switching. That is, it shows the active BWP after BWP switching.

Initial (active) BWP: During or after the RRC connection establishment (connection establishment), before the BWP is configured to the UE, it indicates the BWP that the UE uses for the initial connection.

Default BWP: If not scheduled for a period of time or longer, the UE switches the active DL BWP (or DL/UL BWP pair) to the default BWP.

RA field of BWP: Represents a RA field used to schedule BWP.

RA field length required for BWP: Represents the length/size (e.g., number of bits) of the RA field used to schedule the BWP. The RA field size is determined based on the band (e.g., number of RBs) of the BWP.

Scheduling BWP: Means scheduling data transmission and reception in BWP. For example, it may mean scheduling PDSCH reception in the BWP or scheduling PUSCH transmission.

Scheduling BWP #B from BWP #A: The reception of scheduling information (e.g., DCI) may be performed in BWP #A, and corresponding data transmission and reception may be performed in BWP #B. Also, it may mean that the length/size of scheduling information (e.g., DCI) is determined based on the size (e.g., number of RBs) of BWP #A, and that corresponding data transmission and reception are performed in BWP #B.

Embodiment 1: Bit-Map Based Scheduling

The UE may determine a resource block group (RBG) size P according to the number of PRBs included in the BWP. RBG is a basic unit of a bit-map-based resource allocation method (e.g., RA type 0), and one RBG is composed of P consecutive PRBs. Referring to Table 4, one of two configurations for RBG size P can be configured as RRC, and as the PRB number of the BWP is larger, the UE may have a larger RBG size (P) value. In a BWP having N PRBs, a RA field for bit-map based resource allocation requires a ceil (N/P) bit. For example, if BWP is composed of 40 PRBs and Configuration 1 is configured, RBG size P=4. That is, four (consecutive) PRBs are grouped to form one RBG, and ten RBGs are used for resource allocation. At this time, the RA field needs 10 bits.

TABLE 4

| Carrier Bandwidth Part Size (the number of PRBs) | Configuration 1 | Configuration 2 |
| --- | --- | --- |
| 1~20 | P = 2 | P = 4 |
| 21~50 | P = 4 | P = 8 |
| 51~100 | P = 8 | P = 16 |
| 101~ | P = 16 | P = 16 |

Different BWPs can be configured to have different numbers of PRBs. Therefore, RBG size and RBG number may be different for each BWP. Therefore, in order to schedule another BWP from one BWP, the problem that the length/size (e.g., number of bits) of the RA field is different should be solved.

As a method of solving the above problem, the UE may determine a plurality of DCI lengths based on the length of the RA field required for each BWP if there are a plurality of BWP(s) configured in the UE. Accordingly, the UE may perform PDCCH blind decoding by assuming a plurality of DCI lengths. Although this method solves the above problem, it is assumed that a plurality of DCI lengths is performed, and blind decoding of the PDCCH is performed, so that UE energy consumption is serious.

Alternatively, the UE may determine the DCI length based on the longest of the RA field lengths required for each BWP for a plurality of BWP(s) configured to it. Accordingly, the UE performs blind decoding using the DCI length reflecting the length of the RA field calculated based on the largest BWP. This method solves the above problem and does not increase the number of UE's PDCCH blind decoding, but since the DCI length becomes longer, the encoding gain of the PDCCH is lowered, or high overhead is caused in the control channel.

In another method, only when a higher layer (e.g., RRC) parameter (e.g., BandwidthPart-Config) that informs the BWP configuration is configured, and BWP(s) of different sizes are configured according to the corresponding configuration information, the UE may perform PDCCH blind decoding using the DCI length reflecting the length of the RA field calculated based on the largest BWP. When the BandwidthPart-Config is not configured, the UE may perform PDCCH blind decoding based on the DCI length corresponding to the default BWP.

As another method, the UE may determine the DCI length according to the RA field length required for the activated BWP, and perform PDCCH blind decoding using the determined DCI length. That is, the UE may interpret RA differently according to the BPI value of DCI. For example, when the BPI indicates the currently activated BWP, the RA may be interpreted according to the RBG size of the currently activated BWP. On the other hand, if the BPI indicates a BWP other than the currently activated BWP (hereinafter, a BWP to be newly activated), RA may be interpreted according to the RBG size of the newly activated BWP. In this case, the length of the RA field included in DCI is referred to as $K_{current}$, and the length of the RA field required for the newly activated BWP is referred to as Knew. As mentioned above, the length of the required RA field may be determined by ceil (number of PRBs in BWP/RBG size). Here, if $K_{current}$ is greater than or equal to $K_{new}$, the i-th bit of the $K_{current}$-bit RA field of DCI (hereinafter, DCI RA field) indicates whether to allocate the i-th RBG of the BWP to be newly activated. And, the last $K_{current}$-$K_{new}$ bit(s) of the RA field of DCI is reserved as 0 or 1. If $K_{current}$ is smaller than $K_{new}$, $K_{new}$-$K_{current}$ RBGs among $K_{new}$ RBGs of the newly activated BWP are not always allocated with resources regardless of the RA field value, and the RA field may indicate information on whether $K_{current}$ RBGs of the BWP to be newly activated are allocated. The i-th bit of the DCI RA field indicates whether to allocate the f(i)-th RBG of the BWP to be newly activated. Here, f(i) is a function corresponding to $\{1, 2, \ldots, K_{current}\} \rightarrow \{1, 2, \ldots, K_{new}\}$. For example, the configuration of f(i) may be as follows.

It may be configured as f(i)=i. Therefore, the i-th bit of the RA field of DCI indicates whether to allocate the i-th RBG of the BWP to be newly activated. Here, UEs receive only resource allocation information on 1 to $K_{current}$ RBGs, and cannot receive resource allocation information on $K_{current}$+1 to $K_{new}$ RBGs.

It may be configured as f(i)=i+offset. The offset value can have one of 0, 1, ..., ($K_{new}$-$K_{current}$). Referring to FIG. 13, when BWP #1 has 5 RBGs and BWP #2 has 8 RBGs, the result of resource allocation when BWP #1 indicates BWP #1 scheduling information and resource allocation when BWP #1 indicates BWP #2 scheduling information are as follows. Let the value of the RA field be [1 0 0 1 1]. Referring to FIG. 13(a), when BWP #1 indicates scheduling information of BWP #1, RBG #1, RBG #4, and RBG #5 of BWP #1 may be allocated. Referring to FIG. 13(b), if BWP #1 indicates scheduling information of BWP #2, and the offset is 0, RBG #1, RBG #4, and RBG #5 of BWP #2 can be allocated. Referring to FIG. 13(c), if BWP #1 indicates scheduling information of BWP #2, and the offset is 2, RBG #3, RBG #6, and RBG #7 of BWP #2 can be allocated.

f(i) may be determined from a value derived from the UE's C-RNTI or C-RNTI. For example, $f(i)=i+(C-RNTI \bmod (K_{new}-K_{current}+1))$. Accordingly, the i-th bit of the DCI RA field indicates whether to allocate the $i+(C-RNTI \bmod (K_{new}-K_{current}+1))$ RBG of the BWP to be newly activated. As another example, a pseudo-random sequence using C-RNTI may be used. For example, $f(i)=i+(g(C-RNTI) \bmod (K_{new}-K_{current}+1))$. Here, g(C-RNTI) is a pseudo-random sequence created using C-RNTI. Since f(i) is determined based on C-RNTI, resource allocation due to f(i) is different for each UE. However, in this method, resource allocation due to f(i) is the same regardless of the BWP switching time point.

f(i) may be determined from the C-RNTI and slot index of the UE, or a value derived from the value. For example, $f(i)=i+(n\_slot+C-RNTI \bmod (K_{new}-K_{current}+1))$. Here, n_slot is an index of a slot in which the PDCCH is received or an index of a slot in which the PDSCH is allocated. Accordingly, the i-th bit of the DCI RA field indicates whether to allocate the $i+(n\_slot+C-RNTI \bmod (K_{new}-K_{current}+1))$ RBG of the BWP to be newly activated. As another example, a pseudo-random sequence using C-RNTI and slot index may be used. For example, $f(i)=i+(g (C-RNTI, n\_slot) \bmod (K_{new}-K_{current}+1))$. Here, g(C-RNTI, n_slot) is a pseudo-random sequence created using C-RNTI and n_slot. Since f(i) is determined not only by the C-RNTI value but also by the BWP switching time point, resource allocation due to f(i) is different for each UE and for each BWP switching time point.

As another method, when $K_{new}$ is greater than $K_{current}$, RBG set RBG_set is grouped by combining RBGs of the BWP to be newly activated so that the $K_{current}$-bit RA field (hereinafter, DCI RA field) of the DCI received from the currently activated BWP may indicate whether to schedule the RBG set. For example, RGBs are grouped by S to make RBG sets $K_{new,RBG\_set}=\text{ceil}(K_{new}/S)$. For example, RBG set #1 may consist of RBG #1 to RBG #S, and RBG set #2 may consist of RBG #(S+1) to RBG #(2*S). The remaining RBGs except the last RBG set include S RBGs, and the last RBG set may include $((K_{new}-1) \bmod S)+1$ RBGs. In this case, the i-th bit of the DCI RA field indicates whether to allocate the f(i)-th RBG_set of the BWP to be newly activated. Here, f(i) is a function corresponding to $\{1, 2, \ldots, K_{current}\} \to \{1, 2, \ldots, K_{new,RBG\_set}\}$. For example, the configuration of f(i) may be as follows.

f(i) may be configured as f(i)=i. Accordingly, the i-th bit of the DCI RA field indicates whether to allocate the f(i)-th RBG set of the BWP to be newly activated. Here, UEs only receive resource allocation information for the 1 to $K_{current}$ RBG set, and cannot allocate resource allocation information for the $K_{current}+1$ to $K_{new,RBG\_set}$ RBG set.

It may be configured as f(i)=i+offset. The offset value may have one of 0, 1, ..., $(K_{new,RBG\_set}-K_{current})$.

f(i) may be determined from a value derived from the UE's C-RNTI or C-RNTI. For example, $f(i)=i+(C-RNTI \bmod (K_{new,RBG\_set}-K_{current}+1))$. Accordingly, the i-th bit of the DCI RA field indicates whether to allocate the $i+(C-RNTI \bmod (K_{new,RBG\_set}-K_{current}+1))$-th RGB set of the BWP to be newly activated. As another example, a pseudo-random sequence using C-RNTI can be used. For example, $f(i)=i+(g(C-RNTI) \bmod (K_{new,RBG\_set}-K_{current}+1))$. Here, g(C-RNTI) is a pseudo-random sequence created using C-RNTI. Since f(i) is determined based on C-RNTI, resource allocation due to f(i) is different for each UE. However, in this method, resource allocation due to f(i) is the same regardless of the BWP switching time point.

f(i) may be determined from the C-RNTI and slot index of the UE, or a value derived from the value. For example, $f(i)=i+(n\_slot+C-RNTI \bmod (K_{new,RBG\_set}-K_{current}+1))$. Here, n_slot is an index of a slot in which the PDCCH is received or an index of a slot in which the PDSCH is allocated. Accordingly, the i-th bit of the DCI RA field indicates whether to allocate the $i+(n\_slot+C-RNTI \bmod (K_{new,RBG\_set}-K_{current}+1))$-th RBG set of the BWP to be newly activated. As another example, a pseudo-random sequence using C-RNTI and slot index may be used. For example, $f(i)=i+(g(C-RNTI, n\_slot) \bmod (K_{new,RBG\_set}-K_{current}+1))$. Here, g(C-RNTI, n_slot) is a pseudo-random sequence created using C-RNTI and n_slot. Since f(i) is determined not only by the C-RNTI value but also by the BWP switching time point, resource allocation due to f(i) is different for each UE and for each BWP switching time point.

The above methods are related to an event that may occur when performing BWP switching between BWPs having different PRB numbers. After the BWP switching occurs, the UE may perform PDCCH decoding by calculating the DCI length based on the RA field length of the newly activated BWP. In addition, when operating in a fallback mode, the UE may perform PDCCH decoding by calculating the DCI length based on the RA field length of the BWP considered as the default DL BWP in the case of DL. In addition, in the case of UL, the UE may perform PDCCH decoding by calculating the DCI length based on the RA field length of the BWP considered as the default UL BWP.

As another example of the present invention, if the size of the RA field of the newly activated BWP indicated by the BPI is larger than the size of the RA field of the currently activated BWP, the UE may append '0' to fit the size of a larger RA field. Specifically, when the RA field size of the currently active BWP is called $K_{current}$, and the RA field size of the newly activated BWP is called KRBG,set (or $K_{new}$), after decoding the DCI, the UE may append KRBG_set–$K_{current}$ 0s to the RA field of the $K_{current}$ length, and then interpret the DCI field value (e.g., the RA of the $K_{new}$ length). Here, the following method can be considered in relation to the position where KRBG_set–$K_{current}$ 0s are added.

For example, the UE may append KRBG_set–$K_{current}$ 0s to the front (Most significant bit (MSB), front) of the RA field of the $K_{current}$ length. By using the resource allocation range that the value of the RA field of the $K_{current}$ length can have as it is (e.g., f (i)=i), resource allocation is performed in the newly activated BWP within the resource allocation range that the currently activated BWP can have, or according to the above-described methods, the resource allocation range that the Least Significant Bit (LSB) $K_{current}$ bit can have can be variously reinterpreted. For example, as increasing the resource allocation granularity to perform resource allocation, or having the same resource allocation as the currently active BWP, by configuring an offset value for each UE, resource allocation may be configured to shifted in a newly activated BWP.

As another example, the UE may append KRBG_set−$K_{current}$ 0s to the back (Least significant bit (LSB), back) of the RA field of the length of $K_{current}$. By subtracting some value from the resource allocation range that the value of the RA field of $K_{current}$ length can have, when allocating resources in the newly activated BWP, it is possible to provide flexibility without scheduling limitations as much as possible. For example, when it is configured that the resource allocation range that the value of the RA field of $K_{current}$ length can have is {0, 1, 2, . . . , 9}, and the size of the newly activated BWP is doubled. By adding '0' to the LSB of the RA field, the resource allocation range in the newly activated BWP can be {0, 2, 4, 6, 8, 10, . . . , 18}. By doing this, in the case of performing BWP switching, it is possible to provide flexibility without scheduling limitations as much as possible in allocating resources in the BWP to be newly activated.

As another example, the UE may append P 0s of KRBG_set−$K_{current}$ 0s to the front (most significant bit (MSB), front) of the RA field of the $K_{current}$ length, and append Q 0s to the back (least significant bit (LSB), back) of a RA field of the $K_{current}$ length. Here, P+Q=KRBG_set−$K_{current}$. P (or Q) can be obtained from the remainder of R divided by (KRBG_set−$K_{current}$+1). Here, R can be obtained from the C-RNTI of the UE. For example, P=C-RNTI mod (KRBG_set−$K_{current}$+1), Q=KRBG_set−$K_{current}$−P. In addition, R can be obtained from the UE's C-RNTI and slot index. For example, P=(C-RNTI+ns) mod (KRBG_set−$K_{current}$+1), Q=KRBG_set−$K_{current}$−P. Here, ns represents a slot index. An additional random number may be included in the equation for obtaining P.

Embodiment 2: Scheduling Based on Resource Indication Value (RIV)

As a method for indicating continuously allocated resources, the RIV method is used in LTE. In LTE DL type-2 resource allocation, continuous RB is allocated using the RIV method. More specifically, PDCCH DCI format, 1A, 1B, 1D and EPDCCH DCI format 1A, 1B, 1D, and MPDCCH DCI format 6-1A have RIV values, and through the RIV values, the starting RB index $RB_{start}$ and the number of consecutively allocated RBs $L_{CRBs}$ can be determined. Here, RB may mean a virtual resource block (VRB) or a physical resource block (PRB). In the existing LTE, the RIV value is determined as follows.

if $(L_{CRBs}-1) \leq \lfloor N_{RB}^{DL}/2 \rfloor$ then $RIV = N_{RB}^{DL}(L_{CRBs}-1) + RB_{start}$ else $RIV = N_{RB}^{DL}(N_{RB}^{DL}-L_{CRBs}+1)+(N_{RB}^{DL}-1-RB_{start})$ [Equation 1]

where $L_{CRBs} \geq 1$ and shall not exceed $N_{RB}^{DL}-RB_{start}$.

Here, $N_{RB}^{DL}$ is the number of RBs of DL bandwidth (BW). When the RIV-based resource allocation method is used for uplink, $N_{RB}^{DL}$ may be replaced with $N_{RB}^{UL}$ of RB number of UL BW. When BWP is configured, DL BW and UL BW may be replaced with DL BWP and UL BWP, respectively.

Here, RIV has a value of 0, 1, . . . , $N_{RB}^{DL}*(N_{RB}^{DL}+1)/2-1$. Therefore, the number of bits required to represent RIV in the existing LTE is defined as ceil ($\log_2 (N_{RB}^{DL}*(N_{RB}^{DL}+1)/2)$).

Figure 14:
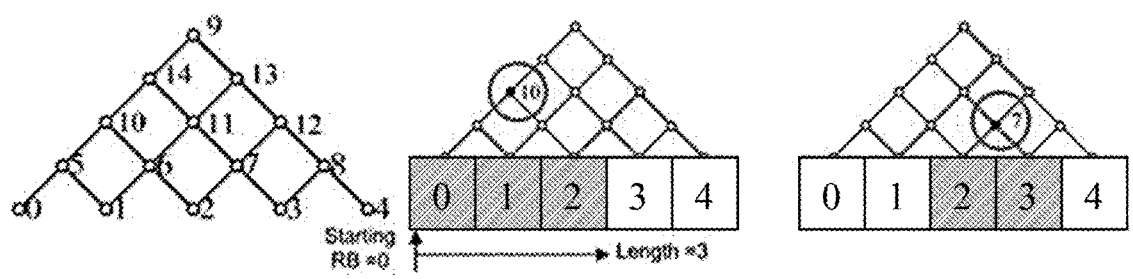
FIG. 14 illustrates resource allocation according to the RIV method.

FIG. 14 illustrates resource allocation according to the RIV method. Referring to FIG. 14, when the number of RBs is 5, $N_{RB}*(N_{RB}+1)/2=15$. Therefore, RIV has a value of 0, 1, . . . , 14, and the number of bits required to represent RIV is four. When $RB_{start}=0$ and $L_{CRBs}=3$, RIV has 10 according to Equation 1. After receiving the RIV=10, the UE may determine $RB_{start}$ and $L_{CRBs}$ satisfying RIV=10 based on the relationship of Equation 1. Consequently, the UE can know that {RB #0 to 2} corresponding to $RB_{start}=0$ and $L_{CRBs}=3$ are allocated for data (e.g., PDSCH or PUSCH) transmission/reception. Similarly, if $RB_{start}=2$ and $L_{CRBs}=2$, RIV has 7. After receiving RIV=7, the UE can know that {RB #2 to 3} corresponding to $RB_{start}=2$ and $L_{CRBs}=2$ are allocated for data transmission/reception.

As described above, different BWPs may be configured to have different numbers of PRBs. In the RIV method, since the number of bits required for the RA field depends on the band size of the BWP (e.g., the number of RBs), in order to schedule another BWP from one BWP, that problem that the lengths of RA fields are different should be solved.

Hereinafter, to solve the above problem, when the length (e.g., the number of bits) of the frequency-domain RA field included in DCI is different from the length required to indicate frequency resource domain allocate information of the active DL BWP (or active UL BWP), proposed is a method for obtaining frequency resource domain allocate information of an active DL BWP (or an active UL BWP). Here, the value of the frequency-domain RA field may indicate a frequency resource (e.g., RB set) allocated for data (PDSCH or PUSCH) transmission in the BWP. The present invention can be limitedly applied when RIV-based scheduling is used and the length (e.g., the number of bits) of the frequency-domain RA field included in DCI is different from the length required to indicate frequency resource domain allocation information of the active DL BWP (or active UL BWP). Here, the length (e.g., number of bits) of the frequency-domain RA field included in DCI may be a value determined based on the number of RBs of the previous active BWP (or, previous active UL BWP) or the number of RBs of the initial BWP (or initial UL BWP)

As an example of the present invention, the UE may determine the DCI length according to the RA field length required for scheduling of the currently activated BWP, and perform PDCCH blind decoding using the determined DCI length. The UE may interpret RA differently according to the decoded DCI BPI value. For example, if the BPI indicates the currently active BWP, the UE interprets the value of the RA field as the RIV value for the currently active BWP. On the other hand, if the BPI indicates a BWP to be newly activated other than the currently activated BWP, the UE may interpret the RA field value as an RIV value for the newly activated BWP. In this case, the length of the RA field included in DCI is referred to as $K_{current}$, and the length of the RA field required for scheduling of the newly activated BWP is referred to as $K_{new}$. For example, $K_{current}$=ceil ($\log_2 (N_{current}*(N_{current}+1)/2)$), and $K_{new}$=ceil ($\log_2 (N_{new}*(N_{new}+1)/2)$. Here, $N_{current}$ is the number of RBs included in the BWP receiving the PDCCH (i.e., the currently activated BWP), and $N_{new}$ is the number of RBs included in the newly activated BWP. Here, if $K_{current}$ is greater than or equal to $K_{new}$, the $K_{new}$ bits of the RA field can be used to (directly) indicate the RIV value of the BWP to be newly activated. And, the remaining $K_{current}-K_{new}$ bit(s) may be reserved as 0 or 1. For example, when the $K_{new}$ bits of the RA field indicate an RIV value for a BWP to be newly activated, $RB_{start}$ and $L_{CRB}$ may have the following values.

$RB_{start}$={0, 1, 2, . . . , $N_{new}-1$}, $L_{CRB}$={1, 2, 3, . . . , $N_{new}$}

Here, $N_{new} \leq N_{current}$, and $L_{CRB} \leq N_{new}-RB_{start}$.

On the other hand, if $K_{current}$ is smaller than $K_{new}$, the following methods can be considered.

Method 1

If $K_{new} > K_{current}$, it may select consecutive M RBs among $N_{new}$ RBs of the BWP to be newly activated, and $K_{current}$ bits of the RA field may be interpreted as RIV values for the M consecutive RBs. M may be determined as the largest value among integer values satisfying $K_{current}$ ceil ($\log_2$ (M*(M+1)/2)). Alternatively, M=$N_{current}$. Let RB index of BWP to be newly activated be 1, 2, ..., $N_{new}$ (or 0, 1, ..., $N_{new}$−1). The starting RB of consecutive M RBs selected from the newly activated BWP (RB with the lowest RB index, e.g., RB #A) may be displayed as an offset value from RB #0 of the BWP to be newly activated (e.g., RB #A=RB #0+offset). For reference, the offset value may have one of 0, 1, ..., $N_{new}$−M.

Here, the offset value may be determined as follows.

The offset value can be fixed to a specific value, for example 0.

The offset value may be determined according to the lowest PRB index of the currently active BWP where the PDCCH is monitored. For example, the smallest PRB index among PRBs of the newly activated BWP that overlaps the lowest PRB of the currently activated BWP can be an offset value. If there is no overlapping PRB, the offset value can be fixed to a specific value, for example 0.

The offset value may be determined according to the largest PRB index of the currently activated BWP. For example, an offset value may be obtained from the largest PRB index (hereinafter, X) among PRBs of the newly activated BWP overlapping with the largest PRB of the currently activated BWP. Specifically, the offset can be obtained by X−M or max (X−M, 0). If there is no overlapping PRB, the offset value can be fixed to a specific value, for example 0.

The offset value may be determined according to a specific value, for example, the smallest PRB index and the largest PRB index of the currently active BWP. For example, an offset value may be obtained from the smallest PRB index (hereinafter, Y) of the PRBs of the newly activated BWP that overlaps the smallest PRB of the currently activated BWP and the largest PRB index (hereinafter, X) among PRBs of the newly activated BWP overlapping with the largest PRB of the currently activated BWP. Specifically, the offset can be obtained by ceil ((X+Y)/2)−M or max (ceil ((X+Y)/2)−M, 0). If there is no overlapping PRB, the offset value can be fixed to a specific value, for example 0.

The offset can be obtained from the CCE index of the CORESET where the PDCCH is received. For example, offset=CCE_index mod ($N_{new}$−M+1). Here, CCE_index may be a value obtained by dividing the smallest CCE index to which the PDCCH is mapped, the largest CCE index, or the smallest CCE index by the aggregation level of the PDCCH.

The offset may be determined from a value derived from the UE's C-RNTI or C-RNTI. For example, offset=C-RNTI mod ($N_{new}$−M+1). Therefore, the $K_{current}$-bit RIV value may indicate whether to allocate resources of RB of RB #(1+(C-RNTI mod ($N_{new}$−M+1))) to RB #(M+(C-RNTI mod ($N_{new}$−M+1))). In addition, the offset may be determined using a pseudo-random sequence using C-RNTI. For example, offset=g(C-RNTI) mod ($N_{new}$−M+1). Here, g(C-RNTI) is a pseudo-random sequence created using C-RNTI. Here, since the offset is determined based on the C-RNTI, resource allocation due to the offset is different for UEs. However, this method receives scheduling information for RBs in the same manner regardless of the BWP switching time point from the perspective of one UE.

The offset may be determined from a value derived from the UE's C-RNTI and slot index, or a combination thereof. For example, offset=(n_slot+C-RNTI) mod ($N_{new}$−M+1)). Here, n_slot is an index of a slot in which the PDCCH is received or an index of a slot in which the PDSCH is allocated. Therefore, the $K_{current}$-bit RIV value may indicate whether to allocate resources of RB of RB #(1+((n_slot+C-RNTI) mod ($N_{new}$−M+1))) to RB #(M+((n_slot+C-RNTI) mod ($N_{new}$−M+1))). As another example, the offset may be determined using a pseudo-random sequence using C-RNTI and slot index. For example, offset=(g (C-RNTI, n_slot) mod ($N_{new}$−M+1)). Here, g(C-RNTI, n_slot) is a pseudo-random sequence created using C-RNTI and n_slot. Here, since the offset is determined according to the BWP switching time point as well as the C-RNTI, different UEs allocate resources differently due to offsets at different time points.

Previously, the offset of the RB unit was described. However, the above-described method may be extended to an offset in sub-BWP units obtained by dividing BWP. The sub-BWP unit offset is a method of dividing $N_{new}$ by sub-BWP having X PRBs to indicate the index of the sub-BWP. For example, if the offset value is 0, it may mean sub-BPW #0, and if the offset value is 1, it may mean sub-BPW #1. Preferably, X=M.

Method 2-1

If $K_{new} > K_{current}$, $N_{new}$ RBs of the BWP to be newly activated are grouped to form M RB sets, and $K_{current}$ bits of the RA field can be interpreted as RIV values for M RB sets. Here, the RB set may consist of consecutive RB(s). Here, M may be determined as the largest value among integers satisfying $K_{current} \geq$ ceil ($\log_2$ (M*(M+1)/2)). Alternatively, M=$N_{current}$. Let RB index of BWP to be newly activated be 1, 2, ..., $N_{new}$ (or 0, 1, ..., $N_{new}$−1). The method of grouping $N_{new}$ RBs into M RB sets is as follows. Each of the first M1 RB sets may group ceil($N_{new}$/M) RBs, and thereafter, each of the M−M1 RB sets may group floor($N_{new}$/M) RBs. Here, M1 is M1=$N_{new}$ mod M.

Method 2-2

If $K_{new} > K_{current}$, $N_{new}$ RBs of the BWP to be newly activated are grouped to form M RB sets, and $K_{current}$ bits of the RA field can be interpreted as RIV values for M RB sets. Here, the RB set may consist of consecutive RB(s). Here, M may be determined as the largest value among ceils ($N_{new}/2^m$) satisfying $K_{current}$ ceil ($\log_2$ (M*(M+1)/2)). That is, M=ceil ($N_{new}/2^m$), m can be set to the smallest value among integers satisfying $K_{current}$ ceil ($\log_2$ (ceil ($N_{new}/2^m$)*(ceil ($N_{new}/2^m$)+1)/2))). Let RB index of BWP to be newly activated be 1, 2, ..., $N_{new}$ (or 0, 1, ..., $N_{new}$−1). The method of grouping $N_{new}$ BWP into M RB sets is as follows. If $N_{new}$ is a multiple of $2^m$, each of the M RB sets can group $2^m$ RBs. If $N_{new}$ is not a multiple of $2^m$, each of the M−1 RB sets can group $2^m$ RBs, and one RB set can group $N_{new}$ mod $2^m$ RBs.

Method 2-3

If $K_{new} > K_{current}$, $N_{new}$ RBs of the BWP to be newly activated are grouped to form M RB sets, and $K_{current}$ bits of the RA field can be interpreted as RIV values for M RB sets. Here, the RB set may consist of consecutive RB(s). Here, M may be determined as the largest value among floor($N_{new}/2^m$) satisfying $K_{current}$ ceil ($\log_2$ (M*(M+1)/2)). That is, M=floor($N_{new}/2^m$), m can be set to the smallest value among integers satisfying $K_{current}$ ceil(log$_2$(floor($N_{new}$/2$^m$)*(floor($N_{new}$/2$^m$)+1)/2)). Let RB index of BWP to be newly activated be 1, 2, . . . , $N_{new}$ (or 0, 1, . . . , $N_{new}$−1). The method of grouping $N_{new}$ BWP into M RB sets is as follows. If $N_{new}$ is a multiple of 2$^m$, each of the M RB sets can group 2$^m$ RBs. If $N_{new}$ is not a multiple of 2$^m$, each of the M RB sets groups 2$^m$ RBs, and the UE can assume that the remaining $N_{new}$−(M*2$^m$) PRBs are not scheduled.

Method 3

Let A be the value indicated in the $K_{current}$ bit frequency-domain RA field of DCI. At this time, the values that A can have are 0, 1, . . . , 2$^{K_{current}}$−1. On the other hand, RIV values required for scheduling of the new BWP to be activated are 0, 1, . . . , $N_{new}$*($N_{new}$+1)/2)−1. When $K_{new}$>$K_{current}$, the RIV value for the newly activated BWP can be obtained by RIV=ceil (A*K), RIV=floor (A*K), or RIV=round (A*K). K=($N_{new}$*($N_{new}$+1)/2)/(2$^{K_{current}}$), K=ceil(($N_{new}$*($N_{new}$+1)/2)/(2$^{K_{current}}$)), K=floor(($N_{new}$*($N_{new}$+1)/2)/(2$^{K_{current}}$)) or K=round(($N_{new}$*($N_{new}$+1)/2)/(2$^{K_{current}}$)).

Method 4-1

If $K_{new}$>$K_{current}$, under the assumption that the value of the $K_{current}$-bit frequency domain RA field is the RIV value for the currently active BWP (that is, the BWP that received the PDCCH), the starting position $S_{current}$ (e.g., $RB_{start,current}$) and the length $L_{current}$ (e.g., $L_{CRB,current}$) can be determined. $RB_{start,current}$ can have one of {0, 1, 2, . . . , $N_{current}$−1}, and $L_{CRB,current}$ can have one of {1, 2, 3, . . . , $N_{current}$}. Here, $N_{current}$ is the number of (P)RBs included in the currently activated BWP. At the same time, by multiplying $RB_{start,current}$ and $L_{CRB,current}$ by K, the UE may obtain the $RB_{start}$ position and the number of consecutive RBs LCRB of frequency resources (e.g., RB set) allocated to the BWP to be newly activated (i.e., BWP indicated by the BPI of the PDCCH). For example, $RB_{start}$=ceil(K*$RB_{start,current}$), $RB_{start}$=floor(K*$RB_{start,current}$) or $RB_{start}$=round(K*$RB_{start,current}$), and $L_{CRB}$=ceil(K*$L_{CRB,current}$), $L_{CRB}$=floor(K*$L_{CRB,current}$) or $L_{CRB}$=round(K*$L_{CRB,current}$). Here, K=$N_{new}$/$N_{current}$, K=ceil($N_{new}$/$N_{current}$), K=floor($N_{new}$/$N_{current}$) or K=round($N_{new}$/$N_{current}$). K can be limited to a value of power of 2 (i.e., K=1, 2, . . . , 2n) (n is a non-negative integer). Specifically, K may have one of power values of 2 based on ($N_{new}$/$N_{current}$), and for example, may have a value satisfying K=2^ceil (log$_2$ ($N_{new}$/$N_{current}$)) or K=2^floor (log$_2$ ($N_{new}$/$N_{current}$)).

When K has one of powers of 2, $RB_{start}$=($S_{current}$*K) and $L_{CRB}$=($L_{current}$*K). $S_{current}$={0, 1, 2, . . . , $N_{current}$−1}, $L_{current}$={1, 2, 3, . . . , $N_{current}$}, and $RB_{start}$ and $L_{CRB}$ may have the following values.

$RB_{start}$={0, K, 2*K, . . . , ($N_{current}$−1)*K}
$L_{CRB}$={K, 2*K, 3*K, . . . , $N_{current}$*K}

Here, $L_{CRB}$≤$N_{current}$*K−$RB_{start}$, and K may have one of {1, 2, . . . , 2n} values. n is an integer greater than or equal to 0. K can be determined based on ($N_{new}$/$N_{current}$). Here, a value satisfying K=2^ceil(log$_2$($N_{new}$/$N_{current}$)) 또는 K=2^floor(log$_2$($N_{new}$/$N_{current}$)) may be given. For example, the K value may be given as follows based on ($N_{new}$/$N_{current}$).

TABLE 5

| X = ($N_{new}$/$N_{current}$) | 1 < X ≤ 2 | 2 < X ≤ 4 | 4 < X ≤ 8 | 8 < X ≤ 16 | ... | 2$^n$ ≤ X < 2$^{n+1}$ |
|---|---|---|---|---|---|---|
| ceil(log$_2$ ($N_{new}$/$N_{current}$)) | 1 | 2 | 3 | 4 | ... | n + 1 |
| K | 2 | 4 | 8 | 16 | ... | 2$^{n+1}$ |

TABLE 6

| X = ($N_{new}$/$N_{current}$) | 1 < X < 2 | 2 ≤ X < 4 | 4 ≤ X < 8 | 8 ≤ X < 16 | ... | 2$^n$ ≤ X < 2$^{n+1}$ |
|---|---|---|---|---|---|---|
| floor(log$_2$ ($N_{new}$/$N_{current}$)) | 0 | 1 | 2 | 3 | ... | n |
| K | 1 | 2 | 4 | 8 | ... | 2$^n$ |

For reference, since the maximum number of PRBs that one BWP can have is 275 PRBs, and the minimum number of PRBs is 20 PRBs occupied by SS/PBCH blocks, $N_{new}$/$N_{current}$ values are given below 13.75. Therefore, the K value obtained in Table 5 is one of 2, 4, 8, and 16, and the K value obtained in Table 6 is one of 1, 2, 4, and 8.

Method 4-2

When $K_{new}$>$K_{current}$, RB'$_{start}$ and L'$_{CRB}$ can be obtained by interpreting the value of the $K_{current}$-bit frequency domain RA field as an RIV value for a BWP having M PRBs. That is, RB'$_{start}$ may have one of {0, 1, 2, . . . , M−1}, and L'$_{CRB}$ may have one of {1, 2, 3, . . . , M}. Here, M may be the largest value among integers satisfying $K_{current}$≥log$_2$ (M*(M+1)/2). Alternatively, M=$N_{current}$. At the same time, as RB'$_{start}$ and L'$_{CRB}$ are multiplied by K, the UE may obtain the $RB_{start}$ position and the number of consecutive RBs of the frequency resource (e.g., RB set) allocated to the BWP to be newly activated (i.e., BWP indicated by the BPI of the PDCCH). For example, $RB_{start}$=ceil(K*RB'$_{start}$), $RB_{start}$=floor(K*RB'$_{start}$) or $RB_{start}$=round(K*RB'$_{start}$) and, $L_{CRB}$=ceil(K*L'$_{CRB}$), $L_{CRB}$=floor(K*L'$_{CRB}$) or $L_{CRB}$=round (K*L'$_{CRB}$). Here, K=$N_{new}$/M, K=ceil($N_{new}$/M) or K=floor ($N_{new}$/M) or K=round($N_{new}$/M). K can be limited to the value of a power of two. K can have one of the powers of 2 based on ($N_{new}$/M), for example, K=2 ^ floor (log$_2$ ($N_{new}$/M)) or K=2^ceil (log$_2$ ($N_{new}$/M)). For details, Method 4-1 can be referenced.

When using bit-map scheduling using RBG, the NR system may use values of 2, 4, 8, and 16 as the number of RBs (hereinafter RBG size) included in one RBG. Therefore, as in Method 4-1/4-2, when K is limited to a power of 2, different UEs of a cell can be easily multiplexed in the frequency domain. Specifically, it is assumed that the UE A uses a bit-map scheduling using RBG, and the RBG size is 8. Meanwhile, it is assumed that the UE B uses Method 4-1/4-2 and K is 3. Since K is 3, the UE B groups K (=3) consecutive RBs (hereinafter, RIV basic unit) and uses them for resource allocation. Here, K is an example that is not a factor of 8. In this case, two RIV basic units are completely included in the RBG, but one RIV basic unit is only partially included. Therefore, when RBG is allocated to the UE A, the UE B cannot use the RIV basic unit only partially in RBG, so resource waste may occur. Conversely, one of the RIV basic units may partially overlap with two RBGs. In this case, if RIV basic units are allocated to the UE B, the UE A cannot use both RBGs partially overlapping with the RIV base unit, which may cause resource waste. On the other hand, if K is limited to a power of 2, resources can be efficiently used between UEs. For example. It is assumed that the UE A uses a bit-map scheduling using RBG, and the RBG size is 8. It is assumed that the UE B uses Method 4-1/4-2 and K is 4. Since K is 4, the UE B groups 4 consecutive RBs (hereinafter, RIV basic unit) and uses them for resource allocation. Here, K is a power of 2, so it is a factor of 8. In this case, two RIV basic units are completely included in the RBG, and only a portion of the RIV basic units are not included. Therefore, when RBG is allocated to UE A, since the UE B has no case where only a part of the RIV basic unit is included in RBG, there is no wasted resource. Conversely, one RIV base unit can overlap only one RBG. In this case, when the RIV base unit is allocated to the UE B, the UE A cannot use only one RBG overlapping the RIV base unit. If K is not given as a power of 2, two RBGs could not be used, but if K is given as a power of 2, only one RBG cannot be used, so that resources can be used more efficiently.

Meanwhile, the reason for limiting K to a power of 2 in Method 4-1/4-2 is to facilitate multiplexing between different UEs. However, when different UEs have different BWPs, the RBG is configured by grouping from the lowest RB of the BWP, or the RIV basic unit is configured by grouping K consecutive PRBs, even if K is limited to a power of 2, resource waste can occur. For example, even if the UE A configures one RBG with {PRB 0, 1, 2, 3, 4, 5, 6, 7}, when the UE B select {PRB 1, 2, 3, 4} and {PRB 5, 6, 7, 8} as the basic unit of RIV where K (=4), two RIV basic units of the UE B are not completely included in one RBG of the UE A. Therefore, it is necessary to match the PRB between RBG and RIV basic units between different UEs.

In order to solve the above problem, resource allocation may be performed only in some PRB(s) among BWPs to be newly activated in consideration of the PRB grid. FIG. 15(a) illustrates a case where two PRBs are grouped to form a PRB grid, and Point A is indicated to the UE from the base station through a higher layer (e.g., RRC) signal. The RB index of the PRB grid represents a common PRB index. In other words, in consideration of the PRB grid, the UE can be scheduled only $N'_{new}$ PRBs among BWPs ($N_{new}$ PRBs) to be newly activated. As an example, FIG. 15(b) illustrates a BWP composed of $N_{new}$ PRBs, and FIG. 15(c) illustrates $N'_{new}$ PRBs that can be scheduled in consideration of the PRB grid. Considering the PRB grid, a method of selecting $N'_{new}$ PRBs among BWPs composed of $N_{new}$ PRBs will be described later. When applying the proposed method, $RB_{start}$, $L_{CRB}$, and K in Method 4-1/4-2 may be modified as follows. For details, Method 4-1/4-2 can be referenced. In Method 4-3/4-4, 'x' represents $N_{new}-N'_{new}$.

Method 4-3 Modification to Method 4-1

$RB_{start}$=ceil(K*$RB_{start,current}$)+x, floor(K*$RB_{start,current}$)+x, round(K*$RB_{start,current}$)+x $L_{CRB}$=ceil(K*$L_{CRB,current}$), floor(K*$L_{CRB,current}$), round(K*$L_{CRB,current}$)

K=$N'_{new}/N_{current}$, ceil($N'_{new}/N_{current}$), floor($N'_{new}/N_{current}$), round($N'_{new}/N_{current}$)

K can be limited to the value of a power of two. K can have one of the powers of 2 based on ($N'_{new}/N_{current}$), and have a value satisfying, for example, K=2^ceil ($\log_2$ ($N'_{new}/N_{current}$)) or K=2^floor ($\log_2$ ($N'_{new}/N_{current}$)). When K is limited to a power of 2, $RB_{start}$=($S_{current}$*K)+x, and $L_{CRB}$=($L_{current}$*K). $RB_{start}$ and $L_{CRB}$ may have the following values.

$RB_{start}$={0+x, K+x, 2*K+x, . . . , ($N_{current}$−1)*K+x}

$L_{CRB}$={K, 2*K, 3*K, . . . , $N_{current}$*K}

Method 4-4 Modification to Method 4-2

$RB_{start}$=ceil(K*$RB'_{start}$)+x, floor(K*$RB'_{start}$)+x, round(K*$RB'_{start}$)+x $L_{CRB}$=ceil(K*L'CRB), floor(K*L'CRB), round(K*L'CRB)

K=$N'_{new}$/M, ceil($N'_{new}$/M), floor($N'_{new}$/M), round($N'_{new}$/M)

K can be limited to the value of a power of two. K can have one of the powers of 2 based on ($N'_{new}$/M), and have a value satisfying, for example, K=2^ceil ($\log_2$ ($N'_{new}$/M)) or K=2^floor ($\log_2$ ($N'_{new}$/M)). When K is limited to a power of 2, $RB_{start}$=(K*$RB'_{start}$)+x, $L_{CRB}$=(K*L'CRB). $RB_{start}$ and $L_{CRB}$ may have the following values.

$RB_{start}$={0+x, K+x, 2*K+x, . . . , (M−1)*K+x}

$L_{CRB}$={K, 2*K, 3*K, . . . , M*K}

Figure 15:
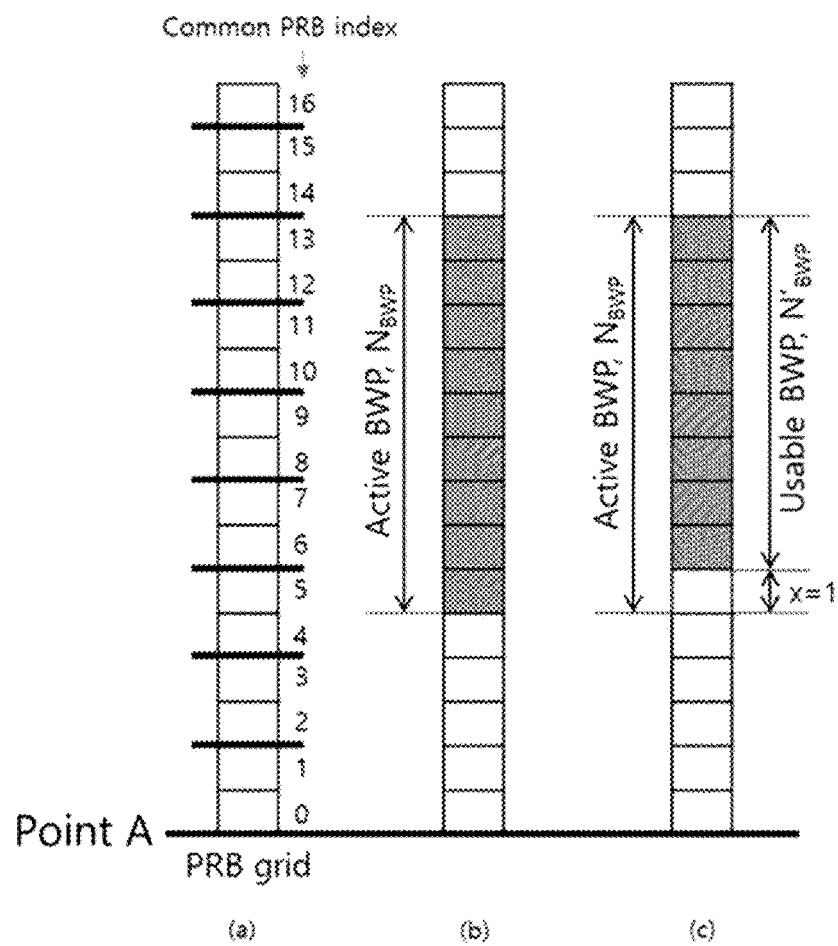
FIG. 15 illustrates resource allocation according to an embodiment of the present invention.

Considering the PRB grid, the method of selecting $N'_{new}$ PRBs from the newly activated BWP composed of $N_{new}$ PRBs is as follows. Let the PRB index of BWP be 0, 1, . . . , $N_{new}$−1. The UE may select PRB x, x+1, . . . , $N_{new}$−1 as $N'_{new}$ PRB. That is, the UE can select $N'_{new}$ PRBs having a high index among PRBs. Here, x may be determined according to the PRB grid. For example, in consideration of the PRB grid of RBG size 2, the value of x may be 0 if the common PRB index of the lowest PRB of the newly activated BWP is even and 1 if odd. Referring to FIG. 15, the common PRB index of the lowest PRB of the UE is 5. Therefore, x=1 can be given. The common PRB index is an index in which RBs are numbered in order from point A indicated by a higher layer (e.g., RRC). The common PRB index for one PRB is the same regardless of the BWP configured for the UE. As another example, when the RBG size that can be configured in the newly activated BWP is R, x may be a result value obtained by modulo R operation on the common PRB index of the lowest PRB of the newly activated BWP. Here, R may be an RBG size configured from a higher layer. If there is no RBG size configured from a higher layer, R may have the smallest value among RBG sizes available in the BWP.

In Methods 4-3 to 4-4, all PRBs of the BWP are not used for scheduling, and only some PRBs are used. The method for using all PRBs of BWP for scheduling is as follows.

Method 2-4 Modification to 2-1

If $K_{new}>K_{current}$, $N_{new}$ RBs of the new BWP are grouped to form M RB sets, and $K_{current}$ bits of the RA field can be interpreted as RIV values for M RB sets. Here, the RB set may consist of consecutive RB(s). Let RB index of BWP to be newly activated be 1, 2, . . . , $N_{new}$ (or 0, 1, . . . , $N_{new}$−1). The method of grouping $N_{new}$ RBs into M RB sets is as follows. Let K be the number of RBs that the RB set should contain. The K value may be a value configured from a higher layer (e.g., RRC) or a value obtained from $N_{current}$ and $N_{new}$ values. The K value can be determined as shown in Table 5 or 6 of Method 4-1. Let $N_{BWP}^{start}$ be the index of the starting RB of the BWP to be activated newly assigned from the common PRB index. Then, M=ceil (($N_{new}$+ ($N_{BWP}^{start}$ mod K))/K) can be determined, and the first RB set includes K−($N_{BWP}^{start}$ mod K) RBs, and the last set of RBs may include ($N_{BWP}^{start}$+$N_{new}$) mod K>0 ($N_{BWP}^{start}$+ $N_{new}$) mod K RBs, and otherwise K RBs. The rest of the RB sets contain K RBs. Here, RBs are grouped in order from the lowest RB index.

Method 5-1

Meanwhile, as another example of the present invention, when $K_{new}>K_{current}$, the value of the $K_{current}$-bit frequency-domain RA field can be obtained from the following equation.

if $S-\lfloor(N_{new}-A)/2\rfloor \leq \lfloor N_{new}/2 \rfloor$

RIV'=AS+L−1 else

RIV'=A($N_{new}$−S+$N_{new}$−A)+(A−L)  [Equation 2]

Here, $N_{new}$ is the number of (P)RBs of the BWP to be newly activated (i.e., the BWP indicated by the BPI of the PDCCH), S is one of {0, 1, 2, . . . , $N_{new}$−1}, and L is one of {1, 2, 3, . . . , A}. S+L can have one of {0, 1, . . . , $N_{new}$}.

RIV' has a value of $\{0, 1, \ldots, N_{new}*A-(A-1)*A/2-1\}$. A can be determined according to the $K_{current}$ bit. For example, A can be set to the largest value (not greater than $N_{new}$) of natural numbers satisfying $K_{current} \geq \log_2 (N_{new}*A-(A-1)*A/2)$. The UE can find the S and L values from RIV' using the A value and the number $N_{new}$ of (P)RBs included in the newly activated BWP. The UE can obtain the $RB_{start}$ and the number of consecutive RBs of frequency resources allocated to the BWP to be newly activated from the S and L values. For example, $RB_{start}=S$, and $L_{CRB}=$ceil (L*K), $L_{CRB}=$floor(L*K) or $L_{CRB}=$round(L*K). Here, $K=N_{new}/A$, $K=$ceil($N_{new}/A$) or $K=$floor($N_{new}/A$). K can be limited to the value of a power of two. In more detail, K can have one of the powers of 2 based on ($N_{new}/A$), for example, $K=2\hat{}$floor ($\log_2 (N_{new}/A)$) or $K=2\hat{}$ceil ($\log_2 (N_{new}/A)$). According to this example, even if $K_{current}$ is smaller than $K_{new}$, the starting position of the RB that can be scheduled may be all PRBs of the BWP to be newly activated.

Method 5-2

As another example of the present invention, when $K_{new} > K_{current}$, the value of the $K_{current}$-bit frequency-domain RA field can be obtained from the following equation.

if $L-1-\lfloor(N_{new}-(B+1))/2\rfloor \leq \lfloor N_{new}/2 \rfloor$

RIV''=(B+1)(L-1)+S else

RIV''=(B+1)($N_{new}-L+N_{new}-B$)+(B-S)    [Equation 3]

Here, $N_{new}$ is the number of (P)RBs of the BWP to be newly activated (i.e., the BWP indicated by the BPI of the PDCCH), S is one of $\{0, 1, 2, \ldots, B\}$, and L is one of $\{1, 2, 3, \ldots, N_{new}\}$. S+L can have one of $\{0, 1, \ldots, N_{new}\}$. RIV''' has a value of $\{0, 1, \ldots, N_{new}*(B+1)-(B*(B+1)/2-1\}$. B can be determined according to the $K_{current}$ bit. For example, B can be set to the largest value (not greater than $N_{new}$) of non-negative integer values satisfying $K_{current} \geq \log_2 (N_{new}*(B+1)A-B*(B+1)/2)$. The UE can find the S and L values from RIV'' using the B value and the number $N_{new}$ of PRBs included in the newly activated BWP. The UE can obtain the $RB_{start}$ and the number of consecutive RBs of frequency resources allocated to the BWP to be newly activated from the S and L values. For example, $RB_{start}=$ceil (S*K), $RB_{start}=$ceil(L*K) or $RB_{start}=$floor(S*K) and, $L_{CRB}=L$. Here, $K=N_{new}/(B+1)$, $K=$ceil($N_{new}/(B+1)$) or $K=$floor($N_{new}/(B+1)$). K can be limited to the value of a power of two. Here, $K=2\hat{}$floor($\log_2(N_{new}/(B+1))$) or $K=2\hat{}$ceil($\log_2(N_{new}/(B+1))$). According to this example, even if $K_{current}$ is less than $K_{new}$, the number of consecutive RBs that can be scheduled may be all PRBs from 1PRB of the BWP to be newly activated.

As another example of the present invention, if the size of the RA field of the newly activated BWP indicated by the BPI is larger than the size of the RA field of the currently activated BWP, the UE may append '0' to fit the size of a larger RA field. More specifically, when the size of the RA field of the currently activated BWP is called $K_{current}$, and when the size of the RA field of the newly activated BWP is called $K_{new}$, after decoding the DCI, the UE may interpret $K_{new}-K_{current}$ 0s to the RA field of the $K_{current}$ length, and then interpret the DCI field value (e.g., the RA of the $K_{new}$ length). Here, the following method can be considered in relation to the position where $K_{new}-K_{current}$ 0s are added.

For example, the UE may append $K_{new}-K_{current}$ 0s to the front of the RA field of $K_{current}$ length (before MSB). By using the resource allocation range that the value of the RA field of the $K_{current}$ length can have as it is (e.g., Method 4-1), resource allocation is performed in the newly activated BWP within the resource allocation range that the currently activated BWP can have, or according to the above-described methods, the resource allocation range that the back of the RA field (after the LSB) can have can be variously reinterpreted. For example, as increasing the resource allocation granularity to perform resource allocation, or having the same resource allocation as the currently active BWP, by configuring an offset value for each UE, resource allocation may be configured to shifted in a newly activated BWP.

As another example, the UE may append $K_{new}-K_{current}$ 0s to the back of the RA field of the $K_{current}$ length (after the LSB). By subtracting some value from the resource allocation range that the value of the RA field of $K_{current}$ length can have, when allocating resources in the newly activated BWP, it is possible to provide flexibility without scheduling limitations as much as possible. For example, when it is configured that the resource allocation range that the value of the RA field of $K_{current}$ length can have is $\{0, 1, 2, \ldots, 9\}$, and the size of the newly activated BWP is doubled. By adding '0' to the LSB of the RA field, the resource allocation range in the newly activated BWP can be $\{0, 2, 4, 6, 8, 10, \ldots, 18\}$. By doing this, in the case of performing BWP switching, it is possible to provide flexibility without scheduling limitations as much as possible in allocating resources in the BWP to be newly activated.

As another example, the UE may append P 0s of the $K_{new}-K_{current}$ 0s to the front (before MSB) of the RA field of the $K_{current}$ length, and append Q 0s to the back (after LSB) of the RA field of the length $K_{current}$. Here, $P+Q=K_{new}-K_{current}$. P (or Q) can be obtained from the remainder of R divided by ($K_{new}-K_{current}+1$). Here, R can be obtained from the C-RNTI of the UE. For example, P=C-RNTI mod ($K_{new}-K_{current}+1$), $Q=K_{new}-K_{current}-P$. In addition, R can be obtained from the UE's C-RNTI and slot index. For example, P=(C-RNTI+ns) mod ($K_{new}-K_{current}+1$), $Q=K_{new}-K_{current}-P$. Here, ns represents a slot index. An additional random number may be included in the equation for obtaining P. Also, P (or Q) may be determined according to the maximum value that RIV can have. For example, when the BWP to be newly activated (e.g., the BWP indicated by the BPI of the PDCCH) is composed of $N_{new}$ PRBs, the RIV values that can have are 0, 1, ..., $N_{new}*(N_{new}+1)/2-1$. Here, Let RIV_max=$N_{new}*(N_{new}+1)/2-1$. At this time, the Q value may be given as the largest value among integers smaller than $\log_2$ (RIV_max/($2\hat{}K_{current}-1$)). That is, the RIV values (00 ... 0 to 11 ... 1) obtained by appending Q 0s to the back (after the LSB) of the RA field of the $K_{current}$ length may always be located within the RIV range of the newly activated BWP.

As another example of the present invention, when $K_{new} > K_{current}$, the UE using the RIV method may perform RIV value interpretation as follows. In the above example, the UE may append P 0s of the $K_{new}-K_{current}$ 0s to the front (before MSB) of the RA field of the $K_{current}$ length, and append Q 0s to the back (after LSB) of the RA field of the length $K_{current}$. Let's assume that the value obtained by interpreting the $K_{new}$ bits obtained in this way is RIV_temp. The UE may assume that the remainder obtained by dividing RIV_temp+N by RIV_max+1 is an RIV value. Here, N may be a different value for each UE, for example, C-RNTI of the UE. Also, N may be a different value for each slot, for example, a slot index. In addition, N may be the remainder after dividing the C-RNTI or slot index of the UE by $2\hat{}Q$.

Meanwhile, in the NR system, frequency hopping may be configured for the UE using the RIV method. When frequency hopping is configured, a 1-bit frequency hopping flag may be transmitted to DCI scheduling PDSCH or PUSCH. For example, if the 1-bit frequency hopping flag is 0, frequency hopping may not be performed and if 1, frequency hopping may be performed. If the 1-bit frequency hopping flag is 1, the UE interprets 1 or 2 bits in the RA field as hopping related information. For example, if the number of PRBs included in the BWP is 50 PRBs or less, one bit in the RA field may be interpreted as hopping-related information, and if the number of PRBs included in the BWP exceeds 50 PRBs, 2 bits in the RA field may be interpreted as hopping-related information. The UE can know the PRB difference or PRB offset value between 2nd hop and 1st hop using 1-bit or 2-bit hopping-related information. When indicated to perform frequency hopping, the UE divides PDSCH or PUSCH in time domain, the front 1st hop can be received/transmitted in the PRB(s) indicated from the RA field, and the second 2nd hop can be received/transmitted by the PRB indicated from the RA field and the PRB(s) obtained from the PRB offset value.

Similar to the previous, let the length of the RA field included in DCI be $K_{current}$ and the length of the RA field required for the newly activated BWP (e.g., new BWP indicated by the BDC of the PDCCH) be $K_{new}$. When $K_{new} \leq K_{current}$, the UE can perform a frequency hopping operation normally. For example, as mentioned above, if the 1-bit frequency hopping flag is 0, frequency hopping may not be performed and if 1, frequency hopping may be performed. If the 1-bit frequency hopping flag is 1, the UE may interpret 1 or 2 bits in the RA field as hopping-related information as described above. Meanwhile, when $K_{new} > K_{current}$, the UE may perform the following operation.

For example, when $K_{new} > K_{current}$, it can be assumed that a UE using the RIV method does not always perform hopping. Therefore, the UE can interpret the 1-bit frequency hopping flag as an RA field. Here, the 1-bit frequency hopping flag can be interpreted by putting it in front of the RA field (before MSB). In addition, the 1-bit frequency hopping flag can be interpreted by putting it after the RA field (after the LSB).

As another example, when $K_{new} > K_{current}$, when the UE using the RIV method is indicated to perform frequency hopping, the UE may interpret 1 bit or 2 bits in the RA field as hopping related information. The number of bits of hopping-related information may vary depending on the bandwidth of the BWP. For example, the number of bits (e.g., 1 bit or 2 bits) of hopping related information may be determined based on a newly activated BWP. For example, if the number of PRBs included in the newly activated BWP is 50 RB or less, the UE may consider 1 bit as hopping-related information, and if more than 50 RB, consider 2 bits as hopping-related information. For example, the number of bits (e.g., 1 bit or 2 bits) of hopping related information may be determined based on a newly activated BWP. For example, if the number of PRBs included in the currently activated BWP is 50 RB or less, the UE may consider 1 bit as hopping-related information, and if more than 50 RB, consider 2 bits as hopping-related information.

Meanwhile, VRB-to-PRB mapping may be configured for a UE using an RIV method in an NR system. When VRB-to-PRB mapping is configured, a 1-bit VRB-to-PRB mapping flag may be transmitted to DCI scheduling PUSCH. For example, if the VRB-to-PRB mapping flag is 0, VRB-to-PRB mapping is not performed, and if it is 1, VRB-to-PRB mapping can be performed. When indicated to perform VRB-to-PRB mapping, the UE can first obtain the allocated VRB from the RIV value. Thereafter, the UE can obtain the relationship between the VRB and the PRB through a block interleaver. Here, VRB has the same number as PRB.

Similar to the previous, let the length of the RA field included in DCI be $K_{current}$ and the length of the RA field required for the newly activated BWP (BWP indicated by the BDC of the PDCCH) be $K_{new}$. When $K_{new} K_{current}$, the UE can perform a VRB-to-PRB hopping operation normally. For example, as described above, the UE may not perform VRB-to-PRB mapping when the VRB-to-PRB mapping flag is 0, and may perform VRB-to-PRB mapping when the VRB-to-PRB mapping flag is 1. Meanwhile, when $K_{new} > K_{current}$, the UE may perform the following operation.

For example, when $K_{new} > K_{current}$, it can be assumed that the UE using the RIV method does not always perform VRB-to-PRB mapping. Or, it can be assumed that the UE always performs VRB-to-PRB mapping. Therefore, when $K_{new} > K_{current}$, the UE using the RIV method can interpret the 1-bit VRB-to-PRB flag as an RA field. Here, the 1-bit VRB-to-PRB flag can be interpreted by putting it in front of the RA field (before MSB). In addition, the 1-bit VRB-to-PRB can be interpreted by putting it after the RA field (after the LSB).

On the other hand, as an example of the present invention, the UE using the RIV method may determine that the PDSCH or PUSCH is not scheduled when the specific field(s) in the DCI are configured as follows. On the other hand, the UE should assume that the BWP to be newly activated (e.g., BWP indicated by the BPI of the PDCCH) is the active BWP. Through this method, the UE can switch the BWP without scheduling a separate PDSCH or PUSCH.

Option 1: All RA fields consist of bit 1.
Option 2: All RA fields are composed of bit 1, and all 5-bit Modulation and Coding Scheme (MCS) fields are composed of bit 1.
Option 3: All RA fields are composed of bit 1, and all 2-bit redundancy version (RV) fields are composed of bit 1.
Option 4: All RA fields are composed of bit 1, all 5-bit MCS fields are composed of bit 1, and all 2-bit RV fields are composed of bit 1.

Meanwhile, in the 3GPP NR system, the UE may be configured to receive a fallback DCI scheduling a PDSCH (or a fallback DCI scheduling a PUSCH). For example, the fallback DCI scheduling PDSCH may include DCI format 1_0, and the fallback DCI scheduling PUSCH may include DCI format 0_0. In this case, the fallback DCI always uses the frequency domain resource allocation method of the RIV method, and the length (e.g., number of bits) of the frequency-domain RA field is determined according to the number of PRBs of the initial DL BWP (or initial UL BWP). For example, if the initial DL BWP (or initial UL BWP) has N PRBs, the length (e.g., number of bits) of the frequency-domain RA field of the fallback DCI may be determined by ceil ($\log_2 (N*(N+1)/2)$). In general, since the number of PRBs of the active DL BWP (or active UL BWP) of the UE is not the same as the number of PRBs of the initial DL BWP (or initial UL BWP), the length (or number of bits) of the frequency resource allocate field required for frequency domain resource allocation of the active DL BWP (or active UL BWP) may not be the same as the length (or number of bits) of the frequency resource allocate field transmitted in the fallback DCI. Therefore, the above problem can be equally solved in the manner proposed above. In other words, the BWP currently activated in the preceding description (Methods 1 to 5-2, etc.) can be replaced with the initial BWP, and the newly activated BWP (BWP indicated by the BPI of the PDCCH) can be replaced with the active BWP. For example, when applied to Method 4-1, $RB_{start}$, $L_{CRB}$, and K in Method 4-1 may be modified as follows. For details, Method 4-1 can be referenced.

Method 4-5 Modification to Method 4-1

The length of the RA field in DCI is $K_{initial}$=ceil ($\log_2$ ($N_{initial}*(N_{initial}+1)/2$)), and the length of the RA field required for the scheduling of the active BWP can be obtained by $K_{active}$=ceil ($\log_2$ ($N_{active}*(N_{active}+1)/2$)). Here, $N_{initial}$ is the number of (P)RBs of the initial BWP, and $N_{active}$ is the number of (P)RBs of the active BWP. When $K_{active} > K_{initial}$, the $RB_{start}$ and $L_{CRB}$ corresponding to the RB set allocated to the active BWP may be determined as follows.

$RB_{start}$=ceil($K*RB_{start,initial}$), floor($K*RB_{start,initial}$), round($K*RB_{start,initial}$)

$L_{CRB}$=ceil($K*L_{CRB,initial}$), floor($K*L_{CRB,initial}$), round ($K*L_{CRB,initial}$)

$K=N_{active}/N_{initial}$, ceil($N_{active}/N_{initial}$), floor($N_{active}/N_{initial}$), round($N_{active}/N_{initial}$)

When K is limited to a power of 2, $RB_{start}$=($S_{initial}*K$), and $L_{CRB}$=($L_{initial}*K$). $RB_{start}$ and $L_{CRB}$ may have the following values.

$RB_{start}$={0, K, 2*K, . . . , ($N_{initial}$−1)*K}

$L_{CRB}$={K, 2*K, 3*K, . . . , $N_{initial}*K$}

Here, $L_{CRB} \le N_{initial}*K - RB_{start}$, and K may have one of {1, 2, . . . , 2n} values. n is an integer greater than or equal to 0. K can be determined based on ($N_{active}/N_{initial}$). Here, a value satisfying K=2^ceil($\log_2(N_{active}/N_{initial})$) or K=2^floor ($\log_2(N_{active}/N_{initial})$) may be given. For example, the K value may be given as follows based on ($N_{active}/N_{initial}$).

TABLE 7

| X = ($N_{active}/N_{initial}$) | 1 < X ≤ 2 | 2 < X ≤ 4 | 4 < X ≤ 8 | 8 < X ≤ 16 | ... | $2^n \le X < 2^{n+1}$ |
|---|---|---|---|---|---|---|
| ceil($\log_2$ ($N_{active}/N_{initial}$)) | 0 | 1 | 2 | 3 | ... | n + 1 |
| K | 1 | 2 | 4 | 8 | ... | $2^{n+1}$ |

TABLE 8

| X = ($N_{active}/N_{initial}$) | 1 < X < 2 | 2 ≤ X < 4 | 4 ≤ X < 8 | 8 ≤ X < 16 | ... | $2^n \le X < 2^{n+1}$ |
|---|---|---|---|---|---|---|
| floor($\log_2$ ($N_{active}/N_{initial}$)) | 0 | 1 | 2 | 3 | ... | n |
| K | 1 | 2 | 4 | 8 | ... | $2^n$ |

For reference, since the maximum number of PRBs that one BWP can have is 275 PRBs, and the minimum number of PRBs occupied by the initial PRB is 24 PRBs, the $N_{active}/N_{initial}$ value is given as 13.46 or less. Therefore, the K value obtained in Table 7 is one of 2, 4, 8, and 16, and the K value obtained in Table 8 is one of 1, 2, 4, and 8.

Figure 16:
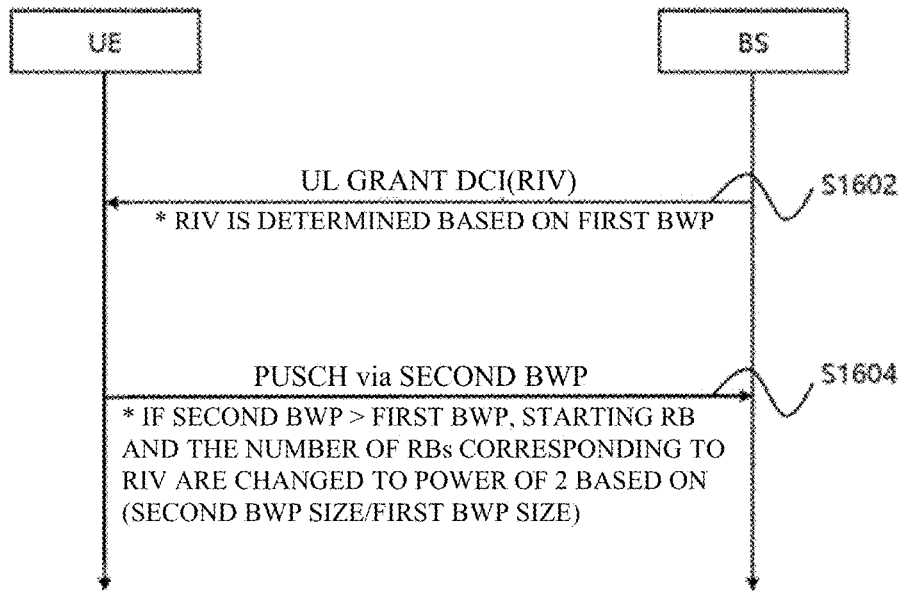
FIG. 16 illustrates signal transmission according to an embodiment of the present invention.
Figure 16:
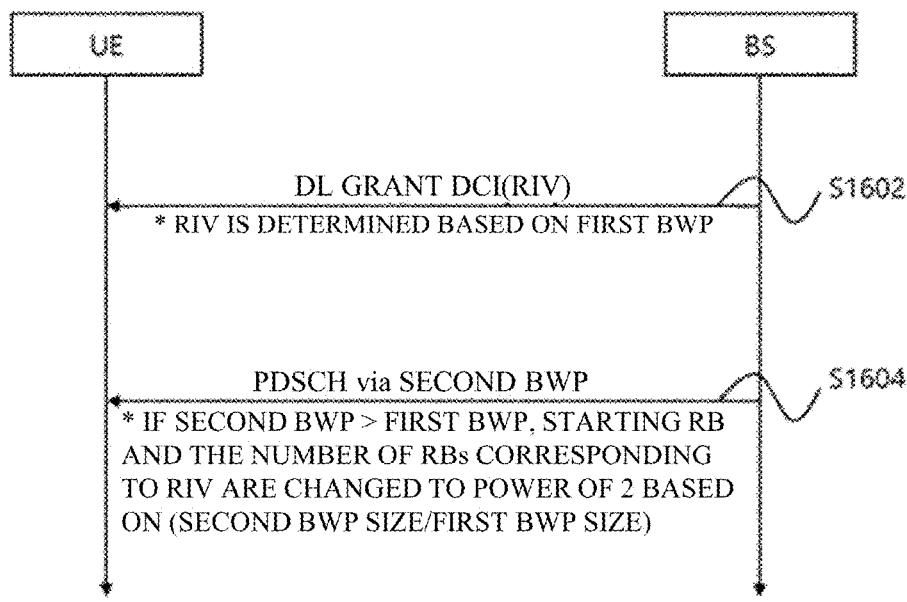

FIG. 16 illustrates a data transmission process according to an embodiment of the present invention. FIG. 16 illustrates a data transmission process according to Methods 4-1 and 4-5. Specifically, FIG. 16($a$) illustrates an uplink data transmission process according to an embodiment of the present invention, and FIG. 16($b$) illustrates a downlink data transmission process according to an embodiment of the present invention.

Referring to FIGS. 16($a$) and 16($b$), the UE may receive scheduling information (e.g., DCI) including resource allocation information (S1602). The scheduling information may include uplink scheduling information (e.g., UL grant DCI) (e.g., DCI format 0_0, 0_1) (FIG. 16($a$)), or downlink scheduling information (e.g., DL grant DCI) (e.g., DCI format) 1_0, 1_1) (FIG. 16 ($b$)). DCI may be received through the PDCCH. Here, the resource allocation information includes RIV determined based on the first BWP, specifically, the number of RBs of the first BWP. Thereafter, the UE may transmit uplink data (e.g., PUSCH) in the second BWP using scheduling information or receive downlink data (e.g., PDSCH) (S1604). Specifically, the UE may transmit the PUSCH on the RB set corresponding to the RIV in the second BWP (FIG. 16($a$)) or receive the PDSCH (FIG. 16($b$)). The second BWP may be a BWP indicated by the BPI in the scheduling information or an active BWP.

Here, when the number of RBs of the second BWP is greater than the number of RBs of the first BWP, the starting RB index S and the number of RBs L of the RB set corresponding to the RIV in the second BWP may be given as one of the following values:

Starting RB index S: {0, K, 2*K, . . . , ($N_{BWP1}$−1)*K}, and

RB number L: {K, 2*K, 3*K, . . . , $N_{BWP1}*K$}

Here, $N_{BWP1}$ is the number of RBs of the first BWP, and K is a power value of 2 and may be determined based on (the number of RBs of the second BWP/the number of RBs of the first BWP).

Preferably, the first BWP and the second BWP may include one of the following:

1) (first BWP, second BWP)=(initial BWP, active BWP), and 2) (first BWP, second BWP)=(currently activated BWP, newly activated BWP).

Here, in the case of 1), DCI includes a fallback DCI (e.g., DCI format 0_0, 1_0), and both DCI and data (e.g., PUSCH, PDSCH) can be transmitted and received in the second BWP (i.e., active BWP). In the case of 2), the currently activated BWP is the active BWP of the time point at which the scheduling information was transmitted, and the newly activated BWP is the BWP indicated by the BPI in the scheduling information. That is, in the case of 2), BWP switching is involved, and DCI (e.g., DCI format 00, 01, 10, 11) is received by the first BWP, and the second BWP may be the BWP indicated by the BPI in DCI.

Preferably, K may have the following values according to (RB number of the second BWP/RB number of the first BWP):

TABLE 9

| | 1 < X < 2 | 2 ≤ X < 4 | 4 ≤ X < 8 | 8 ≤ X < 16 | ... | $2^n \le X < 2^{n+1}$ |
|---|---|---|---|---|---|---|
| K | 1 | 2 | 4 | 8 | ... | $2^n$ |

Here, X is (the number of RBs of the second BWP/the number of RBs of the first BWP), and n is an integer of 0 or more.

Preferably, RIV may have a value satisfying the following Equation:

$$RIV=N_{BWP1}*(L'-1)+S', \text{ if } (L'-1)\le\text{floor}(N_{BWP1}/2), \text{ and}$$

$$RIV=N_{BWP1}*(N_{BWP1}-L'+1)+(N_{BWP1}-1-S'),$$
$$\text{if } (L'-1)>\text{floor}(N_{BWP1}/2),$$

Here, L' is a value of $1 \le L' \le N_{BWP1} - S'$ as L/K, and S' is S/K.

Preferably, when the number of RBs of the second BWP is equal to or less than the number of RBs of the first BWP, the starting RB index S and the number of RBs L of the RB set corresponding to the RIV in the second BWP may be given as one of the following values:

Starting RB index S: $\{0, 1, 2, \ldots, N_{BWP2}-1\}$, and
RB number L: $\{1, 2, 3, \ldots, N_{BWP2}\}$, Here, $N_{BWP2}$ is the number of RBs of the second BWP, and $N_{BWP2} \leq N_{BWP1}$.

Preferably, when the size of the RA field in DCI is referred to as $K_{BWP1}$, and the size of the RA field required for scheduling of the second BWP is $K_{BWP2}$, in the case of $K_{BWP1} < K_{BWP2}$, the UE can decode DCI and then append $K_{BWP2} - K_{BWP1}$ 0s to the RA field of the $K_{current}$ length, and then interpret the DCI field value (e.g., RA of $K_{BWP2}$ length). For example, the UE may append $K_{BWP2} - K_{BWP1}$ 0s to the front of the RA field of KDCI length (before MSB).

Embodiment 3: UL BWP Change

Another problem to be solved in the present invention relates to a case in which the UE fails to receive DCI carrying UL BWP switching information. The DCI that delivers the switching information of the UL BWP may include a BPI for UL BWP. In this case, the UE may determine that the UL BWP indicated by the DCI's BPI is an active UL BWP. In order to receive the DCI (DCI format 0_1) for scheduling PUSCH, the UE needs to know the length (e.g., number of bits) of the frequency domain resource allocation field included in the DCI. For example, the length of the frequency domain resource allocate field of the UE configured with RA type 0 (bit-map method) is equal to the number of RBGs included in the active UL BWP, and the length of the frequency-domain RA field of the UE configured with RA type 1 (RIV method) is equal to ceil ($\log_2$ (N_PRB*(N_PRB+1)/2)). Here, N_PRB is the number of PRBs of the active UL BWP. That is, in order to know the length (e.g., number of bits) of the DCI that the UE monitors to receive PUSCH scheduling information, it is necessary to know the number of PRBs of the active UL BWP. If the reception of the DCI indicating the UL BWP change fails, since the UE continuously monitors the DCI length according to the number of PRBs of the previous UL BWP, a problem that DCI transmitted from the base station (i.e., DCI whose length is determined according to the number of PRBs of the new UL BWP) cannot be received may occur.

In order to solve the above-described problem, the length of a DCI (e.g., DCI format 0_1) scheduling PUSCH may be made irrespective of which UL BWP is an active UL BWP. For example, the length of DCI (e.g., DCI format 0_1) for scheduling PUSCH may be matched with the longest DCI length among DCI lengths derived from each UL BWP. For example, padding bit(s) may be added to DCI (e.g., DCI format 0_1) to match the length of DCI derived from a specific UL BWP to the length of the longest DCI. As another example, the length of DCI (e.g., DCI format 0_1) for scheduling PUSCH may be matched with the DCI length derived from a specific UL BWP. Here, the specific UL BWP may be a UL BWP having the lowest index (or UL BWP ID) among UL BWPs. Also, the specific UL BWP may be the same UL BWP as the index of the active DL BWP (or DL BWP ID). For reference, the UE can configure up to 4 DL BWP and UL BWP in one cell through RRC signals, and when receiving the above configuration, the UE may be configured with an index (or ID) of the BWP. In order to find out the frequency domain resource allocation information in the active UL BWP, the method of Embodiments 1 to 2 may be used as a method of analyzing the frequency-domain RA field.

As another example of the present invention, the length of DCI (e.g., DCI format 0_1) scheduling PUSCH may be determined according to the active DL BWP. For example, regardless of which UL BWP is the active UL BWP, the length (e.g., number of bits) of the frequency-domain RA field of DCI (DCI format 0_1) scheduling PUSCH may be determined according to the number of PRBs of the active DL BWP. In order to find out the frequency domain resource allocation information in the active UL BWP, the method of Embodiments 1 to 2 may be used as a method of analyzing the frequency-domain RA field.

As another example of the present invention, DCI scheduling a PDSCH (e.g., DCI format 1_1) may include information on which UL BWP is an active UL BWP. For example, up to 2 bits may be included in the DCI to indicate which UL BWP is an active UL BWP. Accordingly, when a DCI (e.g., DCI format 1_1) scheduling a PDSCH is received, the UE can know the length of a DCI (e.g., DCI format 0_1) scheduling a PUSCH based on the active UL BWP indicated by the DCI.

As another example of the present invention, fallback DCI scheduling a PUSCH (e.g., DCI format 0_0) may include information on which UL BWP is an active UL BWP. For reference, the length (e.g., number of bits) of the fallback DCI is fixed regardless of the active UL BWP size. Therefore, if a fallback DCI scheduling a PUSCH (e.g., DCI format 0_0) is received, the UE can know the length of DCI (e.g., DCI format 0_1) for scheduling PUSCH based on the active UL BWP indicated by the DCI. Here, 2 bits may be added to a fallback DCI scheduling a PUSCH (e.g., DCI format 00) to indicate which UL BWP is an active UL BWP. Meanwhile, without additional bits, another field of a fallback DCI (e.g., DCI format 0_0) scheduling PUSCH may be reinterpreted to indicate which UL BWP is an active UL BWP. For example, if the values of the 5-bit MCS field and 2-bit RV field of the fallback DCI (e.g., DCI format 0_0) are a specific combination (e.g., 11111 and 11), the UE can determine that the PUSCH is not scheduled, and determine which UL BWP is the active UL BWP using some bit(s) of the frequency-domain RA field.

Meanwhile, a fallback DCI scheduling a PUSCH (e.g., DCI format 0_0) is received, and the fallback DCI may indicate a PUSCH retransmission of a non-fallback DCI (e.g., DCI format 0_1) indicating UL BWP change and PUSCH transmission. In this case, the UE can always ignore the UL BWP change indicated by the non-fallback DCI and transmit the PUSCH in the previous UL BWP. Meanwhile, if a non-fallback DCI (e.g., DCI format 0_1) indicating UL BWP change and PUSCH transmission is not received, the UE may transmit PUSCH in the current UL BWP.

Embodiment 4: SPS/CS PDSCH Reception

If the UE does not receive the DCI in the active DL BWP for a certain period of time, the UE may perform switching to the default DL BWP for the purpose of power saving. Specifically, the UE may configure a timer for the PCell or SCell through an RRC signal (e.g., BWP-Inactivitytimer). The UE configured with the timer increases the timer if it does not receive DCI for every 1 ms (or 0.5 ms in FR2 (carrier with a frequency of 6 GHz or higher)). Here, the DCI is DCI format 1_1 and DCI format 0_1 in a cell using an unpaired spectrum, and DCI format 1_1 in a cell using a paired spectrum. When the timer of the UE reaches a certain value, the UE performs switching to the default DL BWP.

Meanwhile, the UE may be configured to receive a PDSCH configured with an RRC signal (or configured with an RRC signal and activated with an L1 signal). This is called semi-persistent scheduling (SPS) or configured scheduled scheduling (CS). Meanwhile, when an SPS/CS-based PDSCH is transmitted/received, a corresponding DCI does not exist in the PDSCH. Therefore, when SPS/CS is configured, the UE does not receive the corresponding DCI even if it receives the PDSCH. Therefore, even if the PDSCH is received, the timer configured for the UE is increased, and when a predetermined value is reached, performs switching to the default DL BWP. That is, the UE switches to the default DL BWP even though there is a PDSCH composed of RRC signals (or composed of RRC signals and activated with L1 signals). Hereinafter, a solution to the above problem will be described.

As an example of the present invention, if the UE is configured to receive a PDSCH configured with an RRC signal (or configured with an RRC signal and activated with an L1 signal), the UE may not increase the timer. For example, if the UE is not indicated to deactivation or release for an SPS/CS-based PDSCH, the UE may not perform the timer operation and may remain in the current BWP. On the other hand, if the SPS/CS-based PDSCH is instructed to be deactivated or released, the UE can perform a timer operation from the time point. At this time, the timer can be initialized and started.

As another example of the present invention, if configured to receive a PDSCH composed of an RRC signal (or an RRC signal and activated by an L1 signal), the UE may determine whether to perform a timer operation according to the transmission period of the SPS/CS-based PDSCH. For example, the UE may not perform a timer operation when the transmission period is longer than a predetermined size, but may perform a timer operation when it is shorter than a predetermined size. Conversely, the UE may perform a timer operation when the transmission period is shorter than a predetermined size and not perform a timer operation when the transmission period is shorter than a predetermined size.

As another example of the present invention, if configured to receive a PDSCH composed of an RRC signal (or an RRC signal and activated by an L1 signal), the UE may determine whether to perform a timer operation according to the frequency allocation of the PDSCH. For example, the UE may perform a timer operation when the frequency resource allocated to the PDSCH is included in the default DL BWP, and if not, may not perform the timer operation. Here, even if the UE performs switching to the default DL BWP according to the timer operation, the UE may receive the configured PDSCH.

As another example of the present invention, a UE configured to receive a PDSCH composed of an RRC signal (or composed of an RRC signal and activated with an L1 signal) always performs a timer operation, and when switching to the default DL BWP according to the timer operation, the UE may determine whether to receive the PDSCH according to the frequency allocation of the PDSCH. For example, if the frequency resource allocated to the PDSCH is included in the default DL BWP, the UE may receive the PDSCH after switching to the default DL BWP. Otherwise, the UE may determine that the PDSCH has been deactivated or released after switching to the default DL BWP.

Embodiment 5: Resource Allocation Area

Another problem to be solved in the present invention relates to a method for a UE to interpret a frequency-domain RA field of DCI in order to receive a broadcast channel of a base station. Here, the broadcast channel of the base station is transmitted on the PDSCH, and the DCI for transmitting a broadcast channel is a DCI that is scrambled (or addressed) with System Information-RNTI (SI-RNTI) or Paging-RNTI (P-RNTI). The DCI is DCI format 1_0 (fallback DCI). The UE can monitor the PDCCH transmitting the DCI in the common search space of CORESET.

The length (or number of bits) of the frequency-domain RA field of the DCI may be determined according to the number $N_{initial}$ of PRBs occupied by the initial DL BWP. That is, the length (or number of bits) of the frequency-domain RA field is $K_{initial}$=ceil ($\log_2 (N_{initial}*(N_{initial}+1)/2)$). The frequency-domain RA field of the DCI may indicate resource allocation information of the frequency domain of the PDSCH in the RIV method. The RIV value indicates the starting RB of the PDSCH and the number of consecutive RBs.

Figure 17:
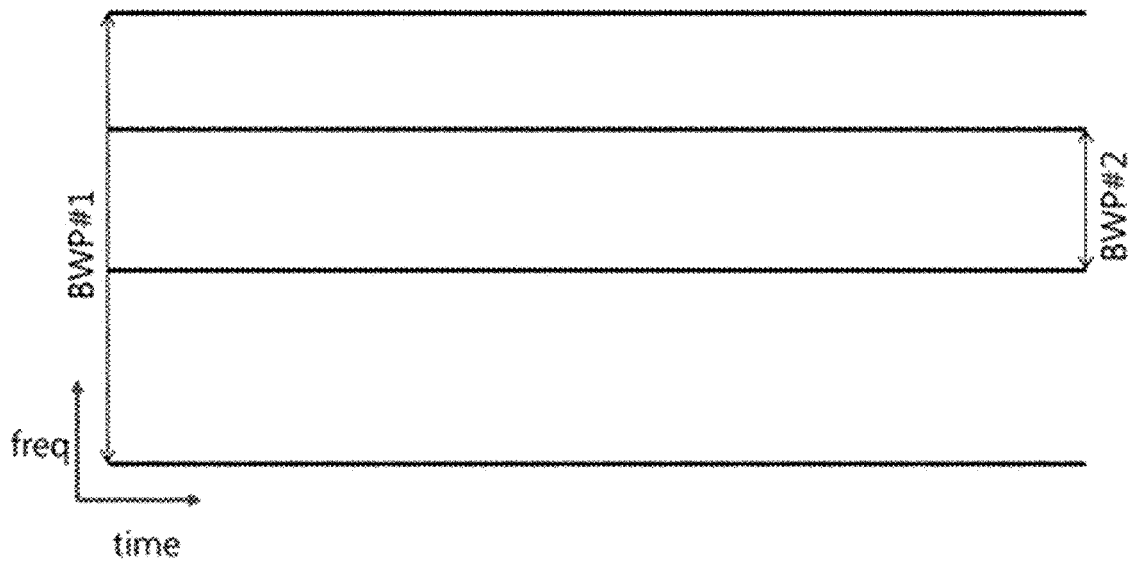
FIG. 17 is a diagram illustrating a BWP configuration.

In general, the initial DL BWP in which each UE is operating may be different. Referring to FIG. 17, the UE A and the UE B may have different active DL BWPs. Here, the active DL BWP refers to a band in which the UE should receive a DL signal or a set of (continuous) PRBs. Referring to FIG. 17, in the UE A, BWP #1 may be configured as an active DL BWP, and in the UE B, BWP #2 may be configured as an active DL BWP. Here, the active DL BWPs BWP #1 and BWP #2 in which the two UEs are operating may overlap each other. Also, by configuring CORESET on the overlapping active DL BWP, two UEs can monitor it. That is, two different UEs can monitor the same CORESET even if the active DL BWP is different. In addition, two different UEs may have the same BWP. For example, in order to receive a PDCCH transmitting remaining minimum system information (RMSI) in the initial access process and a PDSCH transmitting the RMSI, the UE may configure the initial DL BWP through a Physical Broadcast Channel (PBCH). In addition, the UE may configure a default DL BWP as a fallback BWP through an RRC signal. When the default DL BWP is configured, the UE can switch the BWP to the default DL BWP if the UE does not receive DCI from the active DL BWP for a certain period of time.

Next, when the DCI for the broadcast channel is received in CORESET, suggested is a method for the UE to find the PRB index $RB_{start}$ and length $L_{CRB}$ of the broadcast channel in the active DL BWP from the frequency-domain RA field of DCI.

First, the UE can find the relative starting PRB index $RB_{start,temp}$ and length $L_{CRB}$ from the frequency-domain RA field of DCI. For example, the UE may obtain $RB_{start,temp}$ and $L_{CRB}$ by interpreting the RIV value using the number of RBs included in the initial DL BWP. As another example, the UE may obtain $RB_{start,temp}$ and $L_{CRB}$ by interpreting the RIV value using the maximum number of RBs M. M is the maximum number of PRBs that the $K_{initial}$ Bit Frequency-Domain RA field can represent, and is the largest natural number that satisfies ceil ($\log_2 (M*(M+1)/2)$)<ceil ($\log_2 (N_{initial}*(N_{initial}+1)/2)$). Alternatively, $M=N_{initial}$. The UE may obtain the actual PRB index $RB_{start}$ in the active DL BWP from the relative starting PRB index $RB_{start,temp}$ as $RB_{start}=RB_{start\_temp}$+Reference. Here, Reference is a non-negative integer and can be obtained as follows.

Figure 18:
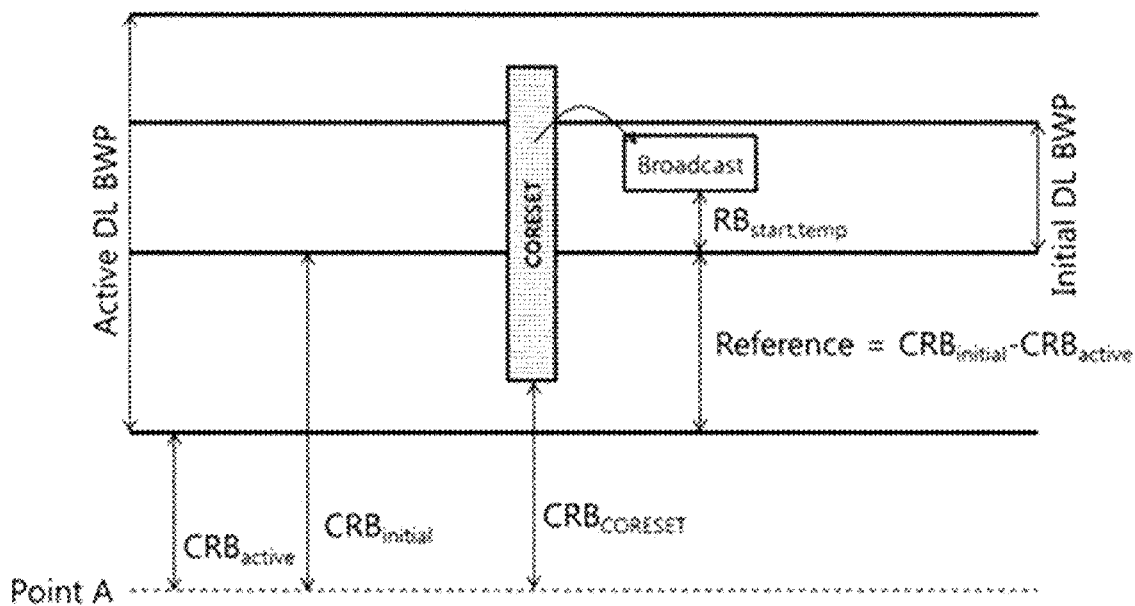
FIGS. 18 to 19 illustrate resource allocation according to an embodiment of the present invention.

For example, referring to FIG. 18, the UE may obtain a reference according to the inclusion relationship between the active DL BWP and the initial DL BWP, and determine the starting index $RB_{start}$ of the PRB in which the broadcast channel is located in the active DL BWP using the Reference. Specifically, if the active DL BWP of the UE completely includes the initial DL BWP, and the subcarrier interval between the active DL BWP and the initial DL BWP is the same, the UE may assume that a broadcast channel can be transmitted in PRBs overlapping the initial DL BWP in the active DL BWP. That is, the reference may be determined by the difference between the lowest common RB index $CRB_{initial}$ of the initial DL BWP and the lowest common RB index $CRB_{active}$ of the active DL BWP. That is, Reference=$CRB_{initial}$–$CRB_{active}$. Accordingly, the PRB index in which the broadcast channel starts in the active DL BWP may be determined as $RB_{start}$=$RB_{start\_temp}$+Reference=$RB_{start\_temp}$+$CRB_{initial}$–$CRB_{active}$. Here, the CRB (common RB) index is an index of RBs in which 12 subcarriers determined according to the subcarrier interval from absolute Point A in the frequency domain are grouped. Here, the subcarrier interval for determining the CRB index is the same as the subcarrier interval between the initial DL BWP and the active DL BWP.

Figures 19, 20:
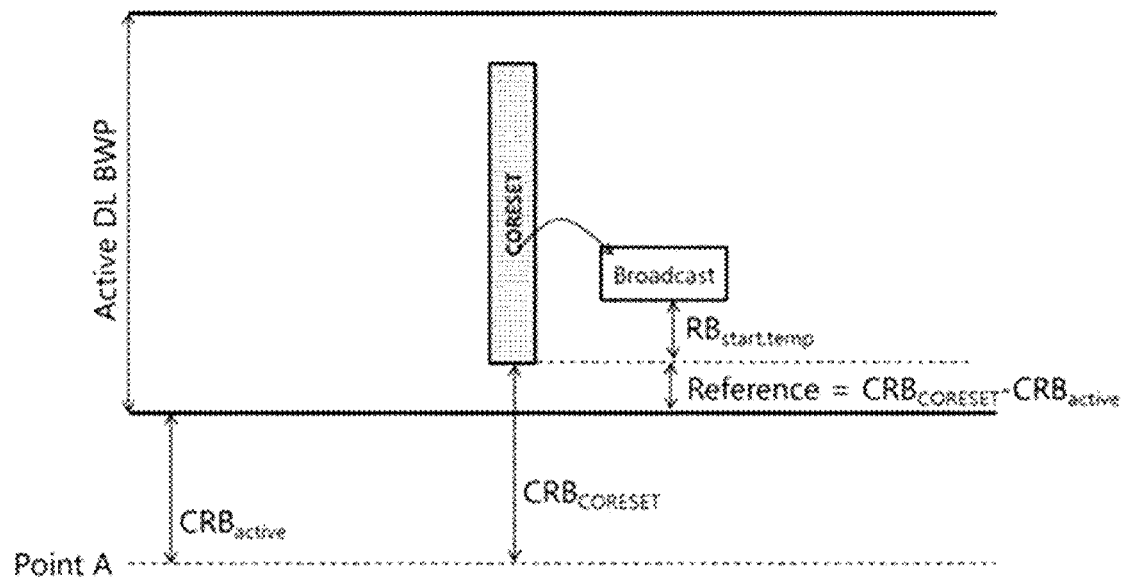
FIG. 20 illustrates signal transmission according to an embodiment of the present invention.

As another example, referring to FIG. 19, the UE may obtain a reference according to the inclusion relationship between the current DL BWP and the initial DL BWP, and determine the starting index $RB_{start}$ of the PRB in which the broadcast channel is located in the active DL BWP using the Reference. Specifically, when the active DL BWP does not completely include the initial DL BWP (e.g., disjoint or partially overlapped), or the subcarrier interval between the active DL BWP and the initial DL BWP is different, the UE may obtain a PRB through which the broadcast channel is transmitted according to the PRB where the CORESET that schedules the broadcast channel is located. That is, the reference may be determined as the difference between the lowest common RB index $CRB_{CORESET}$ of the CORESET that schedules the broadcast channel and the lowest common RB index $CRB_{active}$ of the active DL BWP. That is, Reference=$CRB_{CORESET}$–$CRB_{active}$. Accordingly, the PRB index in which the broadcast channel starts in the active DL BWP may be determined as $RB_{start}$=$RB_{start\_temp}$+Reference=$RB_{start\_temp}$+$CRB_{CORESET}$–$CRB_{active}$.

As another example, the UE may obtain a reference according to the inclusion relationship between the active DL BWP and one specific DL BWP, and determine the starting index $RB_{start}$ of the PRB in which the broadcast channel is located in the active DL BWP using the Reference. Specifically, if the active DL BWP of the UE completely includes the specific DL BWP, and the subcarrier interval between the active DL BWP and the specific DL BWP is the same, the UE may assume that a broadcast channel can be transmitted in PRBs overlapping the specific DL BWP in the active DL BWP. That is, the reference may be determined by the difference between the lowest common RB index $CRB_{selected}$ of the specific DL BWP and the lowest common RB index $CRB_{active}$ of the active DL BWP. That is, Reference=$CRB_{selected}$–$CRB_{active}$. Accordingly, the PRB index in which the broadcast channel starts in the active DL BWP may be determined as $RB_{start}$=$RB_{start\_temp}$+Reference=$RB_{start\_temp}$+$CRB_{selected}$–$CRB_{active}$. Here, one specific DL BWP may be configured as a higher layer (e.g., RRC) signal from the base station to the UE. Also, one specific DL BWP may be a default BWP configured by a base station to a higher layer (e.g., RRC) signal to a UE.

As another example, referring to FIG. 19, the UE may obtain a reference according to the inclusion relationship between the active DL BWP and one specific DL BWP, and determine the starting index $RB_{start}$ of the PRB in which the broadcast channel is located in the active DL BWP using the Reference. Specifically, when the active DL BWP does not completely include the specific DL BWP (e.g., disjoint or partially overlapped), or the subcarrier interval between the active DL BWP and the initial DL BWP is different, the UE may obtain a PRB through which the broadcast channel is transmitted according to the PRB where the CORESET that schedules the broadcast channel is located. That is, the reference may be determined as the difference between the lowest common RB index $CRB_{CORESET}$ of the CORESET that schedules the broadcast channel and the lowest common RB index $CRB_{active}$ of the active DL BWP. That is, Reference=$CRB_{CORESET}$–$CRB_{active}$. Accordingly, the PRB index in which the broadcast channel starts in the active DL BWP may be determined as $RB_{start}$=$RB_{start\_temp}$+Reference=$RB_{start\_temp}$+$CRB_{CORESET}$–$CRB_{active}$. Here, one specific DL BWP may be configured as a higher layer (e.g., RRC) signal from the base station to the UE. Also, one specific DL BWP may be a default BWP configured by a base station to a higher layer (e.g., RRC) signal to a UE.

As another example, the base station may configure a reference value to the UE as a higher layer (e.g., RRC) signal. According to the reference value composed of RRC signals, the PRB index that the broadcast channel starts in the active DL BWP may be determined as $RB_{start}$=$RB_{start\_temp}$+Reference.

As another example, the base station may configure a CRB index $CRB_{reference}$ for deriving a reference value as a higher layer (e.g., RRC) signal to the UE. $CRB_{reference}$ is an absolute PRB index in which a PDSCH transmitting a broadcast channel can be located. Accordingly, the PRB index in which the broadcast channel starts in the active DL BWP may be determined as $RB_{start}$=$RB_{start\_temp}$+Reference=$RB_{start\_temp}$+$CRB_{reference}$–$CRB_{active}$. If the active DL BWP does not include a PRB configured with the CRB index $CRB_{reference}$, or the active DL BWP does not include PRBs from a $CRB_{reference}$ to a specific length, the UE may obtain a PRB through which the broadcast channel is transmitted according to the PRB where the CORESET that schedules the broadcast channel is located. That is, the reference may be determined as the difference between the lowest common RB index $CRB_{CORESET}$ of the CORESET that schedules the broadcast channel and the lowest common RB index $CRB_{active}$ of the active DL BWP. That is, Reference=$CRB_{CORESET}$–$CRB_{active}$. Accordingly, the PRB index in which the broadcast channel starts in the active DL BWP may be determined as $RB_{start}$=$RB_{start\_temp}$+Reference=$RB_{start\_temp}$+$CRB_{CORESET}$–$CRB_{active}$.

FIG. 20 illustrates signal transmission according to an embodiment of the present invention. Referring to FIG. 20, the communication device may check the RB set corresponding to resource allocation information in the frequency resource allocation area of the active BWP (S2002). For example, the communication device may index the RB based on the starting point of the frequency resource allocation region, and then check the RB set corresponding to resource allocation information (e.g., bit-map, RIV). Here, when the condition is satisfied, the resource allocation area may follow the initial BWP. Therefore, when the condition is satisfied, resource allocation information corresponds to the RB set in the initial BWP. Here, the condition may include (1) the active DL BWP completely includes the initial DL BWP, and (2) the active BWP and the initial BWP have the same subcarrier interval. Thereafter, the communication device may transmit a radio signal in the RB set corresponding to the resource allocation information.

Figure 21:
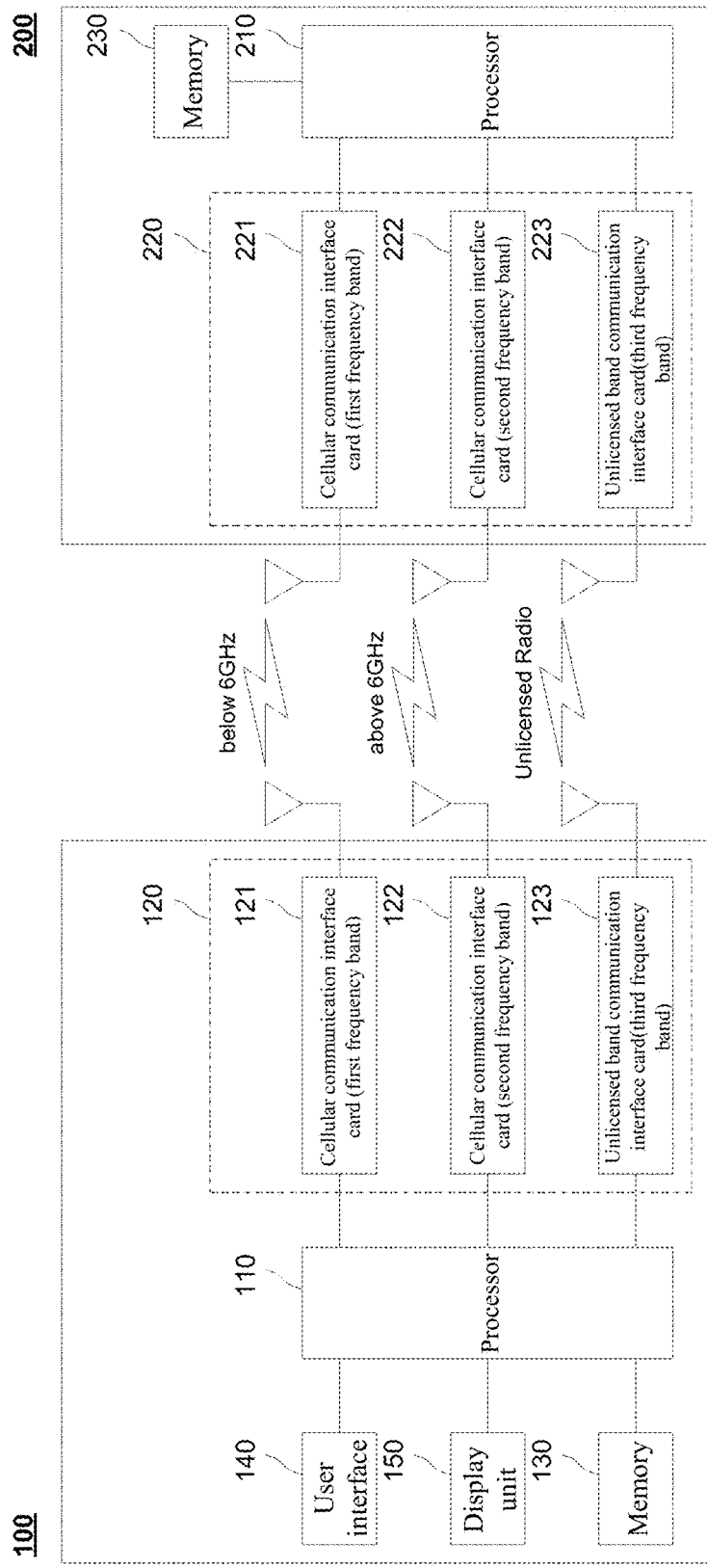
FIG. 21 is a block diagram showing the configurations of a UE and a base station according to an embodiment of the present invention.

FIG. 21 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

Next, The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 21 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

What is claimed is:

1. A user equipment (UE) for use in a wireless communication system, the UE comprising:
   a processor; and
   a communication module,
   wherein the processor is configured to:
   receive downlink control information (DCI) including a resource indication value (MV), wherein the MV is defined to indicate a starting index and a length, with reference to a number $N_{BWP1}$ of resource blocks (RBs) in a first bandwidth part (BWP); and
   transmit or receive a physical shared channel on a contiguous RB set corresponding to the RIV within a second BWP, wherein the second BWP is different from the first BWP and has a number $N_{BWP2}$ of RBs,
   wherein, when $N_{BWP2} > N_{BWP1}$, a starting index S and a length L of the contiguous RB set have respectively one of the following values, based on the RIV:
   the starting index S: $\{0, K, 2*K, \ldots, (N_{BWP1}-1)*K\}$, and
   the length L: $\{K, 2*K, 3*K, \ldots, N_{BWP1}*K\}$,
   where K has a value within a set of $\{1, 2, \ldots, 2^n\}$, based on $N_{BWP2}/N_{BWP1}$, and n represents a positive integer, and
   where S and L are expressed in unit of RB.

2. The UE of claim 1, wherein a relation between the first BWP and the second BWP comprises:
   (first BWP, second BWP)=(initial BWP, active BWP), or
   (first BWP, second BWP)=(currently activated BWP, newly activated BWP),
   where the currently activated BWP is an active BWP at a time when the scheduling DCI is received, and the newly activated BWP is a BWP indicated by a bandwidth part indicator (BPI) in the DCI.

3. The UE of claim 1, wherein K and $N_{BWP2}/N_{BWP1}$ satisfy a relation including at least part of the following table:

| X | 1 < X < 2 | 2 ≤ X < 4 | 4 ≤ X < 8 | 8 ≤ X < 16 |
|---|---|---|---|---|
| K | 1 | 2 | 4 | 8 | where X is $N_{BWP2}/N_{BWP1}$.

4. The UE of claim 1, wherein the MV has a value satisfying the following equation:

$$RIV = N_{BWP1}*(L'-1)+S', \text{ if } (L'-1) \leq \text{floor}(N_{BWP1}/2), \text{ and}$$

$$RIV = N_{BWP1}*(N_{BWP1}-L'+1)+(N_{BWP1}-1-S'),$$
$$\text{if } (L'-1) > \text{floor}(N_{BWP1}/2),$$

where L' is a value of $1 \leq L' \leq N_{BWP1}-S'$ as L/K, and S' is S/K, and
where floor is a flooring function.

5. The UE of claim 1, wherein when $N_{BWP1} \geq N_{BWP2}$, the starting index S and the length L of the contiguous RB set have one of the following values, respectively:
   the starting RB index S: $\{0, 1, 2, \ldots, N_{BWP2}-1\}$, and
   the length L: $\{1, 2, 3, \ldots, N_{BWP2}\}$.

6. A base station (BS) for use in a wireless communication system, the BS comprising:
   a processor; and
   a communication module,
   wherein the processor is configured to:
   transmit downlink control information (DCI) including a resource indication value (RIV), wherein the MV is defined to indicate a starting index and a length, with reference to a number $N_{BWP1}$ of resource blocks (RBs) in a first bandwidth part (BWP); and receive or transmit a physical shared channel on a contiguous RB set corresponding to the RIV within a second BWP, wherein the second BWP is different from the first BWP and has a number $N_{BWP2}$ of RBs, wherein, when $N_{BWP2} > N_{BWP1}$, a starting index S and a length L of the contiguous RB set have respectively one of the following values, based on the RIV:

the starting index S: $\{0, K, 2*K, \ldots, (N_{BWP1}-1)*K\}$, and the length L: $\{K, 2*K, 3*K, \ldots, N_{BWP1}*K\}$, where K has a value within a set of $\{1, 2, \ldots, 2^n\}$, based on $N_{BWP2}/N_{BWP1}$, and n represents a positive integer, and where S and L are expressed in unit of RB.

7. The BS of claim 6, wherein a relation between the first BWP and the second BWP comprises:

(first BWP, second BWP)=(initial BWP, active BWP), or (first BWP, second BWP)=(currently activated BWP, newly activated BWP), where the currently activated BWP is an active BWP at a time when the DCI is received, and the newly activated BWP is a BWP indicated by a bandwidth part indicator (BPI) in the DCI.

8. The BS of claim 6, wherein K and $N_{BWP2}/N_{BWP1}$ satisfy a relation including at least part of the following table:

| X | 1 < X < 2 | 2 ≤ X < 4 | 4 ≤ X < 8 | 8 ≤ X < 16 |
|---|---|---|---|---|
| K | 1 | 2 | 4 | 8 | where X is $N_{BWP2}/N_{BWP1}$.

9. The BS of claim 6, wherein the MV has a value satisfying the following equation:

$$RIV = N_{BWP1}*(L'-1)+S', \text{ if } (L'-1) \leq \text{floor}(N_{BWP1}/2), \text{ and}$$

$$RIV = N_{BWP1}*(N_{BWP1}-L'+1)+(N_{BWP1}-1-S'),$$
$$\text{if } (L'-1) > \text{floor}(N_{BWP1}/2),$$

where L' is a value of $1 \leq L' \leq N_{BWP1}-S'$ as L/K, and S' is S/K, and where floor is a flooring function.

10. The BS of claim 6, wherein when $N_{BWP1} \geq N_{BWP2}$, the starting index S and the length L of the contiguous RB set have one of the following values, respectively:

the starting RB index S: $\{0, 1, 2, \ldots, N_{BWP2}-1\}$, and the length L: $\{1, 2, 3, \ldots, N_{BWP2}\}$.

11. A method performed by a user equipment (UE) in a wireless communication system, the method comprising:

receiving downlink control information (DCI) including a resource indication value (RIV), wherein the MV is defined to indicate a starting index and a length, with reference to a number $N_{BWP1}$ of resource blocks (RBs) in a first bandwidth part (BWP); and transmitting or receiving a physical shared channel on a contiguous RB set corresponding to the MV within a second BWP, wherein the second BWP is different from the first BWP and has a number $N_{BWP2}$ of RBs, wherein, when $N_{BWP2} > N_{BWP1}$, a starting index S and a length L of the contiguous RB set have respectively one of the following values, based on the RIV:

the starting index S: $\{0, K, 2*K, \ldots, (N_{BWP1}-1)*K\}$, and the length L: $\{K, 2*K, 3*K, \ldots, N_{BWP1}*K\}$, where K has a value within a set of $\{1, 2, \ldots, 2^n\}$, based on $N_{BWP2}/N_{BWP1}$, and n represents a positive integer, and where S and L are expressed in unit of RB.

12. The method of claim 11, wherein a relation between the first BWP and the second BWP comprises:

(first BWP, second BWP)=(initial BWP, active BWP), or (first BWP, second BWP)=(currently activated BWP, newly activated BWP), where the currently activated BWP is an active BWP at a time when the DCI is received, and the newly activated BWP is a BWP indicated by a bandwidth part indicator (BPI) in the DCI.

13. The method of claim 11, wherein K and $N_{BWP2}/N_{BWP1}$ satisfy a relation including at least part of the following table:

| X | 1 < X < 2 | 2 ≤ X < 4 | 4 ≤ X < 8 | 8 ≤ X < 16 |
|---|---|---|---|---|
| K | 1 | 2 | 4 | 8 | where X is $N_{BWP2}/N_{BWP1}$.

14. The method of claim 11, wherein the RIV has a value satisfying the following equation:

$$RIV = N_{BWP1}*(L'-1)+S', \text{ if } (L'-1) \leq \text{floor}(N_{BWP1}/2), \text{ and}$$

$$RIV = N_{BWP1}*(N_{BWP1}-L'+1)+(N_{BWP1}-1-S'),$$
$$\text{if } (L'-1) > \text{floor}(N_{BWP1}/2),$$

where L' is a value of $1 \leq L' \leq N_{BWP1}-S'$ as L/K, and S' is S/K, and where floor is a flooring function.

15. The method of claim 11, wherein when $N_{BWP1} \geq N_{BWP2}$, the starting index S and the length L of the contiguous RB set have one of the following values, respectively:

the starting RB index S: $\{0, 1, 2, \ldots, N_{BWP2}-1\}$, and the length L: $\{1, 2, 3, \ldots, N_{BWP2}\}$.

16. A method performed by a base station (BS) in a wireless communication system, the method comprising:

transmitting downlink control information (DCI) including a resource indication value (RIV), wherein the MV is defined to indicate a starting index and a length, with reference to a number $N_{BWP1}$ of resource blocks (RBs) in a first bandwidth part (BWP); and transceiving receiving or transmitting a physical shared channel on a contiguous RB set corresponding to the RIV within a second BWP, wherein the second BWP is different from the first BWP and has a number $N_{BWP2}$ of RBs, wherein, when $N_{BWP2} > N_{BWP1}$, a starting index S and a length L of the contiguous RB set have respectively one of the following values, based on the RIV:

the starting index S: $\{0, K, 2*K, \ldots, (N_{BWP1}-1)*K\}$, and the length L: $\{K, 2*K, 3*K, \ldots, N_{BWP1}*K\}$, where K has a value within a set of $\{1, 2, \ldots, 2^n\}$, based on $N_{BWP2}/N_{BWP1}$, and n represents a positive integer, and where S and L are expressed in unit of RB.

17. The method of claim 16, wherein a relation between the first BWP and the second BWP comprises:

(first BWP, second BWP)=(initial BWP, active BWP), or (first BWP, second BWP)=(currently activated BWP, newly activated BWP), where the currently activated BWP is an active BWP at a time when the DCI is received, and the newly activated BWP is a BWP indicated by a bandwidth part indicator (BPI) in the DCI.

18. The method of claim 16, wherein K and $N_{BWP2}/N_{BWP1}$ satisfy a relation including at least part of the following table:

| X | 1 < X < 2 | 2 ≤ X < 4 | 4 ≤ X < 8 | 8 ≤ X < 16 |
|---|-----------|-----------|-----------|------------|
| K | 1         | 2         | 4         | 8          | where X is $N_{BWP2}/N_{BWP1}$.

19. The method of claim 16, wherein the MV has a value satisfying the following equation:

$$RIV = N_{BWP1}*(L'-1)+S', \text{ if } (L'-1) \leq \text{floor}(N_{BWP1}/2), \text{ and}$$

$$RIV = N_{BWP1}*(N_{BWP1}-L'+1)+(N_{BWP1}-1-S'),$$
$$\text{if } (L'-1) > \text{floor}(N_{BWP1}/2),$$

where L' is a value of $1 \leq L' \leq N_{BWP1}-S'$ as L/K, and S' is S/K, and where floor is a flooring function.

20. The method of claim 16, wherein when $N_{BWP1} \geq N_{BWP2}$, the starting index S and the length L of the contiguous RB set have one of the following values, respectively:

the starting RB index S: $\{0, 1, 2, \ldots, N_{BWP2}-1\}$, and
the length L: $\{1, 2, 3, \ldots, N_{BWP2}\}$.

* * * * *

UNITED STATES PATENT AND TRADEMARK OFFICE
CERTIFICATE OF CORRECTION

PATENT NO. : 11,737,078 B2
APPLICATION NO. : 17/722370
DATED : August 22, 2023
INVENTOR(S) : Kyungjun Choi, Minseok Noh and Jinsam Kwak It is certified that error appears in the above-identified patent and that said Letters Patent is hereby corrected as shown below:

In the Claims

In Claim 1, Column 48, Line 8, "(MV), wherein the MV" should be changed to --(RIV), wherein the RIV--.
In Claim 2, Column 48, Line 32, "scheduling" should be deleted.
In Claim 4, Column 48, Line 44, "MV" should be changed to --RIV--.
In Claim 6, Column 48, Line 64, "MV" should be changed to --RIV--.
In Claim 9, Column 49, Line 33, "MV" should be changed to --RIV--.
In Claim 11, Column 49, Line 50, "MV" should be changed to --RIV--.
In Claim 11, Column 49, Line 55, "MV" should be changed to --RIV--.
In Claim 16, Column 50, Line 40, "MV" should be changed to --RIV--.
In Claim 16, Column 50, Line 44, "transceiving" should be deleted.
In Claim 19, Column 51, Line 10, "MV" should be changed to --RIV--.

Signed and Sealed this
Second Day of July, 2024

Katherine Kelly Vidal
*Director of the United States Patent and Trademark Office*